United States Patent
Sugawara et al.

(10) Patent No.: US 8,812,754 B2
(45) Date of Patent: Aug. 19, 2014

(54) NETWORK RELAY DEVICE AND MEMORY CONTROL METHOD

(75) Inventors: Kentaroh Sugawara, Yokohama (JP); Shinichi Akahane, Hachioji (JP); Hiroki Yano, Kawasaki (JP); Yuichi Ishikawa, Kawasaki (JP)

(73) Assignee: Alaxala Networks Corporation, Kanagawa (JP)

( * ) Notice: Subject to any disclaimer, the term of this patent is extended or adjusted under 35 U.S.C. 154(b) by 1073 days.

(21) Appl. No.: 12/813,891

(22) Filed: Jun. 11, 2010

(65) Prior Publication Data

US 2011/0058564 A1  Mar. 10, 2011

(30) Foreign Application Priority Data

Sep. 9, 2009  (JP) .................................. 2009-208291

(51) Int. Cl.
  *G06F 3/00* (2006.01)
  *H04L 12/28* (2006.01)

(52) U.S. Cl.
  USPC ............................................ 710/52; 370/412

(58) Field of Classification Search
  None
  See application file for complete search history.

(56) References Cited

U.S. PATENT DOCUMENTS

2006/0209684 A1* 9/2006 Bei .............................. 370/229
2007/0280277 A1* 12/2007 Lund ........................... 370/412

FOREIGN PATENT DOCUMENTS

| JP | 2001-144753 A | 5/2001 |
| JP | 2002-247081 A | 8/2002 |
| JP | 2004-240711 A | 8/2004 |

OTHER PUBLICATIONS

Japanese Office Action received in Japanese Application No. 2009-208291 dated Nov. 8, 2012.

\* cited by examiner

*Primary Examiner* — Hyun Nam
(74) *Attorney, Agent, or Firm* — Mattingly & Malur, PC

(57) ABSTRACT

A network relay device includes a packet buffer for temporarily storing a received packet, and a packet buffer control section for changing an effective buffer number depending on the received amount of packet. When a traffic amount is small, the packet buffer control section reduces the power consumption by stopping the feeding of power or the supply of clock to a part of the packet buffers. The network relay device further includes plural table memories storing a table for deciding the transfer destination of packet, and a table memory control section for changing an effective table number according to a required number of table entries. When the required table entry number is small, the table memory control section reduces the power consumption by stopping the feeding of power or the supply of clock to a part of the table memories.

15 Claims, 36 Drawing Sheets

| MONITOR PACKET NUMBER LOWER LIMIT | MONITOR PACKET NUMBER UPPER LIMIT | EFFECTIVE BUFFER NUMBER |
|---|---|---|
|  | B | N × 1/4 |
| A | D | N × 2/4 |
| C | F | N × 3/4 |
| E |  | N |

FIG. 4

| TABLE CLASSIFICATION | ASSIGNED TABLE MEMORY | USE ENTRY NUMBER | EFFECTIVE TABLE MEMORY NUMBER |
|---|---|---|---|
| IPv4 UNI-CAST | 610-1~610-K | e_c | m_ac |
| IPv4 MULTI-CAST | UNASSIGNED | 0 | 0 |
| IPv6 UNI-CAST | UNASSIGNED | 0 | 0 |
| IPv6 MULTI-CAST | UNASSIGNED | 0 | 0 |
| MAC ADDRESS TABLE | UNASSIGNED | 0 | 0 |
| FILTER TABLE | UNASSIGNED | 0 | 0 |
| . . . | . . . | . . . | . . . |

| ENTRY NUMBER | USE ENTRY NUMBER LOWER LIMIT | USE ENTRY NUMBER UPPER LIMIT | EFFECTIVE TABLE MEMORY NUMBER |
|---|---|---|---|
| 1 | | B | K × 1/4 |
| 2 | A | D | K × 2/4 |
| 3 | C | F | K × 3/4 |
| 4 | E | | K |

NETWORK RELAY DEVICE AND MEMORY CONTROL METHOD

CLAIM OF PRIORITY

The present application claims priority from Japanese patent application JP 2009-208291 filed on Sep. 9, 2009, the content of which is hereby incorporated by reference into this application.

BACKGROUND OF THE INVENTION

1. Field of the Invention

The present invention relates to a network relay device and a memory control method, and more particularly to a power-saving network relay device and a memory control method for reducing the power consumption of the network relay device.

2. Description of the Related Art

A network relay device such as a switch or router is important in configuring a network. In recent years, with the larger-scale network and the increasing amount of data transmitted via the network, the higher performance and larger capacity of the network relay device are remarkable. On the other hand, with the higher performance and larger capacity, the power consumption of the network relay device tends to increase, and from the viewpoint of system maintenance cost or environmental protection, it is a problem to suppress the power consumption of the network relay device.

Herein, there was disclosed a technology for a buffer management method for making a cell transfer efficiently in an Asynchronous Transfer Mode (ATM) switchboard (e.g., refer to JP-A-2002-247081). In this patent, the accumulated number of cells in a queue provided for each of one or more service classes for a cell is determined in making the cell transfer using a common buffer. And the accumulated number of cells is compared with a threshold preset for the queue, the threshold is dynamically changed depending on the result, and the cell is accumulated in the common buffer based on the changed threshold, thereby providing a buffer management method for making the cell transfer efficiently.

SUMMARY OF THE INVENTION

With the buffer management method of JP-A-2002-247081, it is impossible to suppress the power consumption of the device. A first object of the invention is to suppress the power consumption of the network relay device, including a switch and a router, and to provide a technique for controlling the power consumption by switching the buffer between the activated and deactivated states depending on a traffic amount. More specifically, one object of the invention is to activate or deactivate a memory by means for stopping the feeding of power or the supply of clock to a part of a packet buffer within the device to activate only a minimum necessary buffer depending on the traffic amount, and to reduce the power consumption.

Also, in JP-A-2002-247081, there is no description on suppressing the power consumption of a table memory storing a table that the switch or router owns to decide the destination of packet.

A second object of the invention is to suppress the power consumption of a network relay device such as a switch or router and to provide a technique for controlling the power consumption by dynamically switching the table memory between the activated and deactivated states depending on the number of entries to be registered in the table. More specifically, another object of the invention is to activate only a minimum necessary table memory by stopping the feeding of power or the supply of clock to a part of the table memory within the device depending on a required number of entries in the table and to reduce the power consumption.

In one embodiment of the invention, a network relay device 10 includes a packet buffer 500 for temporarily storing a received packet, and a packet buffer control section 300 for changing an effective buffer number depending on the received amount of packet. When the traffic amount is small, the packet buffer control section 300 reduces the power consumption by means of stopping the feeding of power or the supply of clock to a part of the packet buffers, because there is less influence on a performance even if the number of buffers is smaller.

In another embodiment of the invention, a network relay device 10 includes a retrieval table 610 having a plurality of table memories 610-1 to 610-K that can individually control the presence or absence of supplying the power or operation clock, and a table memory control section 640 for changing an effective table memory number depending on a required table entry number. When the table entry number is small, the table memory control section 640 stops the feeding of power or the supply of clock to a part of the table memories to a reduce the power consumption.

The invention can be implemented in a variety of forms.

According to the first solving means of this invention, there is provided a network relay device for relaying a packet, comprising:

a packet receiving section;

a plurality of packet buffers operating independently of each other, in which the packet received by the packet receiving section is stored;

a packet sending section for sending the packet read from the packet buffer;

a packet monitor section for measuring a transfer amount of packet for a certain period of time; and a packet buffer control section for controlling the packet buffer in accordance with the transfer amount of packet;

wherein the packet buffer control section determines an effective buffer number required for the device depending on the transfer amount of packet measured by the packet monitor section and a predetermined threshold, and controls the supply of power or clock to the packet buffers to be turned ON or OFF in accordance with determined effective buffer number.

According to the second solving means of this invention, there is provided a network relay device for relaying a packet, comprising:

a plurality of table memories for storing at least any one table of a destination table, a filter table and a priority control table, and operating independently of each other;

a table memory control section for controlling the table memory in accordance with an entry number to be stored in the table; and a control section for instructing a registration or deletion of an entry into or from the table;

wherein the table memory control section stores a current use entry number of the table, and if an instruction of registering the entry including a registering entry number or an instruction of deleting the entry including a deleting entry number is notified from the control section, the table memory control section determines a required effective table memory number from the current use entry number of the table and the registering entry number or the deleting entry number and a predetermined threshold, and controls a feeding of power or a supply of clock to a part of the table memories to be turned ON or OFF in accordance with determined effective table memory number.

According to the third solving means of this invention, there is provided a memory control method in a network relay device relaying a packet and comprising a plurality of packet buffers operating independently of each other, the packet buffers storing received packet, the method including:

measuring transfer amount of packet for a certain period of time;

determining an effective buffer number required for the network relay device depending on measured transfer amount of packet and a predetermined threshold; and controlling a feeding of power or a supply of clock to packet buffers to be turned ON or OFF in accordance with determined effective buffer number.

According to the fourth solving means of this invention, there is provided a memory control method in a network relay device relaying a packet and comprising a plurality of table memories for storing at least any one table of a destination table, a filter table and a priority control table, and for operating independently of each other, the method including:

storing in advance a current use entry number of the table;

determining a required effective table memory number from the current use entry number of the table and a registering entry number or a deleting entry number and a predetermined threshold, if an instruction of registering a entry including the registering entry number or an instruction of deleting the entry including the deleting entry number is notified; and controlling a feeding of power or a supply of clock to a part of the table memories to be turned ON or OFF in accordance with determined effective table memory number.

According to the invention, it is possible to activate or deactivate a memory by means for stopping the feeding of power or the supply of clock to a part of a packet buffer within the device to activate only a minimum necessary buffer depending on the traffic amount, and to reduce the power consumption.

According to the invention, it is possible to activate only a minimum necessary table memory by stopping the feeding of power or the supply of clock to a part of the table memory within the device depending on a required number of entries in the table and to reduce the power consumption.

BRIEF DESCRIPTION OF THE DRAWINGS

FIG. 4 is an explanatory view showing one example of an effective buffer number management table.

FIG. 17 is an explanatory view showing one form of an entry number management table 660.

FIG. 18 is an explanatory view showing one example of an effective table memory number determination table 670.

DETAILED DESCRIPTION OF THE PREFERRED EMBODIMENTS

The preferred embodiments of a router/switch to which the present invention is applied will be described below to clarify the constitution and operation of the invention.

1. First Embodiment

Figure 1:
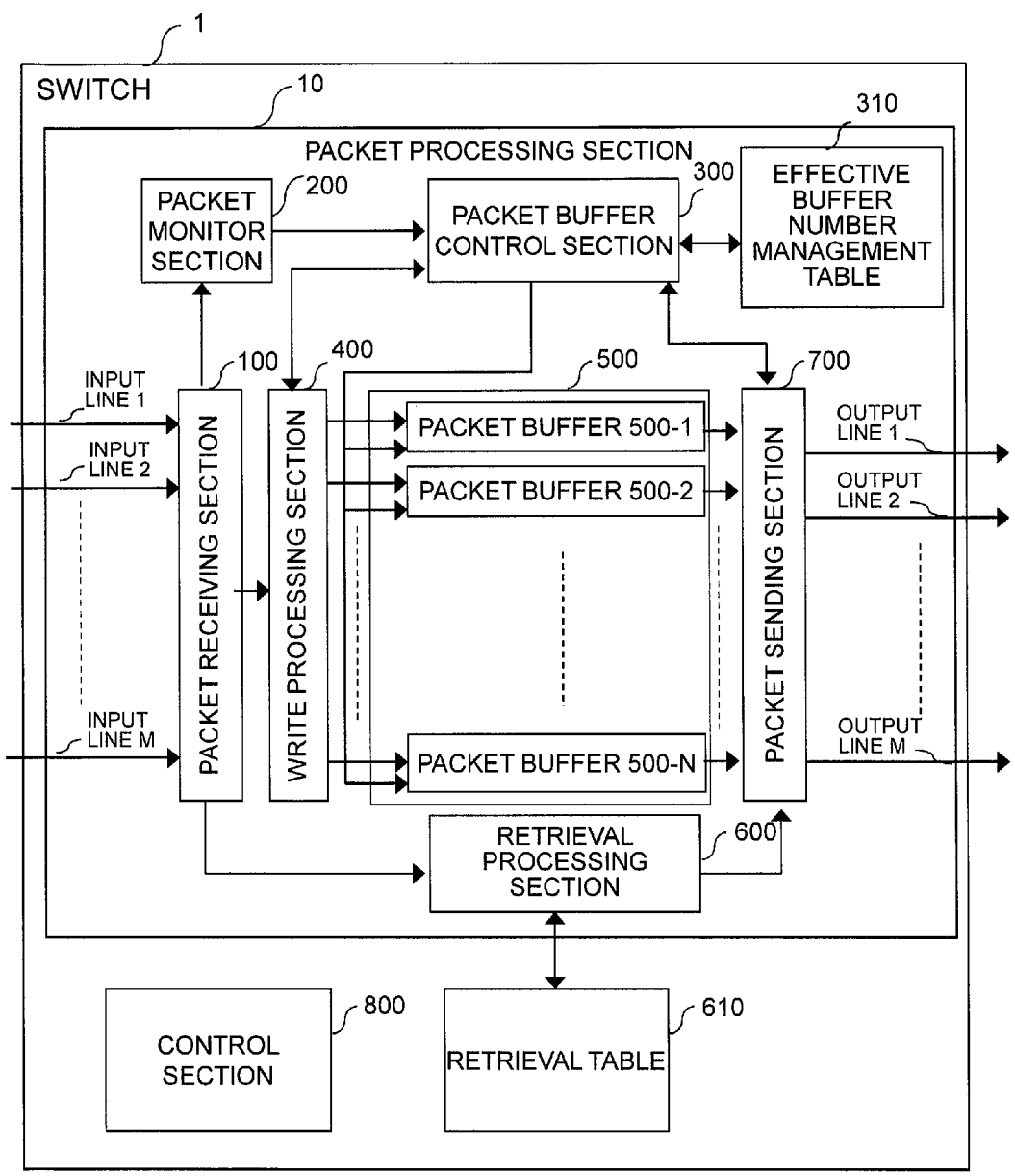
FIG. 1 is an explanatory view showing the configuration of a switching device according to a first embodiment of the invention.

FIG. 1 is an explanatory view showing the configuration of a switch according to a first embodiment of the invention.

This switch 1 includes a packet processing section 10, a retrieval table 610, and a control section 800 for controlling various kinds of operation of the switch 1. The packet processing section 10 has a packet receiving section 100, a packet monitor section 200, a packet buffer control section 300, an effective buffer number management table 310, a write processing section 400, a plurality of packet buffers 500 operating independently, a retrieval processing section 600, and a packet sending section 700. The control section 800 is connected via a bus, not shown, to the packet monitor section 200, the packet buffer control section 300, a retrieval table 610, and the packet receiving section 100.

The packet receiving section 100, receiving an input packet, sends a notice of receiving the packet to the packet monitor section 200, sends the packet data to the write processing section 300, and sends the header data to the retrieval processing section 600. In this example, one packet data and a buffer write area are in the relation of one to one, but if one packet data is large, they may be in the relation of one to n (n is a natural number of 2 or greater) in which the packet data is written into plural write areas).

The packet monitor section 200 has a function of counting the number of input packets, and measures the monitor packet number (transfer amount of packet) P transferred to the device within a predetermined time, and conveys the monitor packet number P to the packet buffer control section 300.

The packet buffer control section 300 has a function of activating only a minimum necessary buffer among the individually operating buffers by controlling the power source or clock of the packet buffer 500 in accordance with the monitor packet number P measured by the packet monitor section 100, and a function of controlling the write position information (hereinafter a write pointer) and the read position information (hereinafter a read pointer) of the packet buffer 500.

The write processing section 400 performs a process for writing the packet data into the packet buffer 500 in accordance with a write pointer, for example.

The packet buffer 500 temporarily stores the packet data until the retrieval processing section 600 ends the retrieval process. Also, the packet buffer 500 has the individually operating buffers, which can activate or deactivate the power source or the clock independently of each other.

The retrieval processing section 600 receives the header information of packet from the packet receiving section 100, searches the retrieval table 610 for the header information as a search key, and transfers the retrieved information such as destination to the packet sending section 700.

The retrieval table 610 stores the associated data with the header information and the destination information.

The packet sending section 700 receives the retrieved information from the retrieval processing section 600, reads the packet information relevant to the packet received from the retrieval processing section 600 from the packet buffer 500 in accordance with a read pointer, for example, and sends the packet to the corresponding line.

Figure 2:
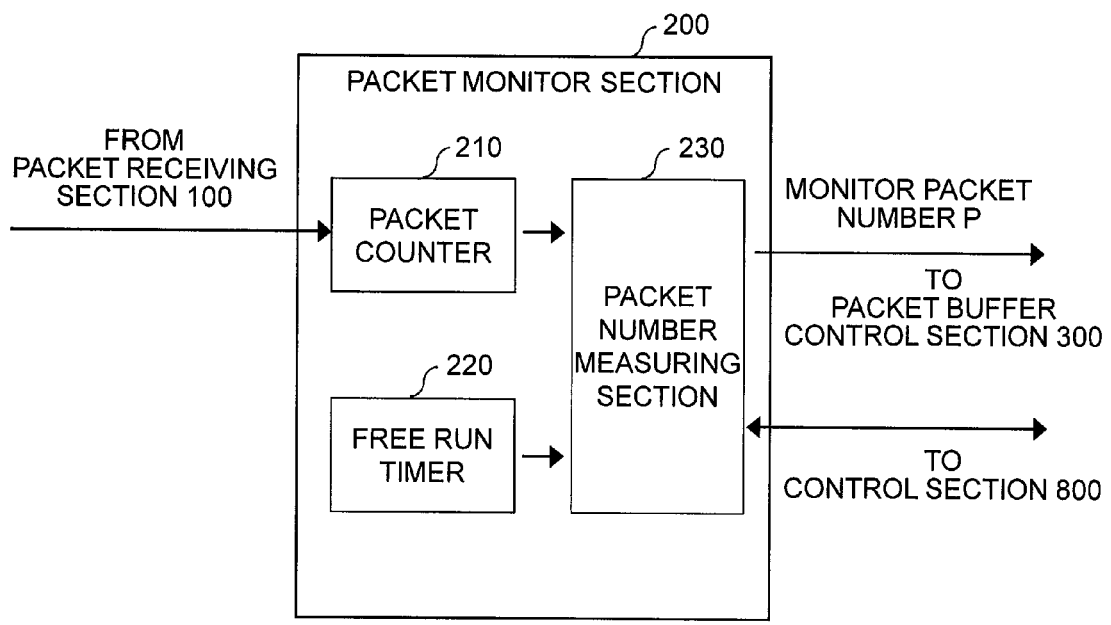
FIG. 2 is an explanatory view showing the configuration of a packet monitor section according to the embodiment.

The control line 800 has a function of setting a monitor time interval T for a packet number measuring section 230 as shown in FIG. 2, a function of setting the value of the effective buffer number management table 310, and a function of setting the value of the retrieval table 610.

FIG. 2 is an explanatory view showing the detailed configuration of the packet monitor section 200.

The packet monitor section 200 has a packet counter 210, a free run timer 220, and the packet number measuring section 230. The packet counter 210 receives a notice of packet receipt from the packet receiving section 100, in which the counter increases one at every time of receiving one packet. The free run timer 220 operates independently of receiving the packet, and the free run timer 220 increases one at every fixed time. The packet number measuring section 230 always receives the count values of the packet counter 210 and the free run timer 220. At a set counter interval T of the free run timer 220, a monitor packet number $P=[(A1-A0)/T]$ is determined by dividing the current packet counter value (assumed as A1), from which the packet counter value (assumed as A0) at the previous time of measurement is subtracted, by the monitor time T. The packet monitor section 200 transfers the monitor packet number P to the packet buffer control section 300.

Figure 3:
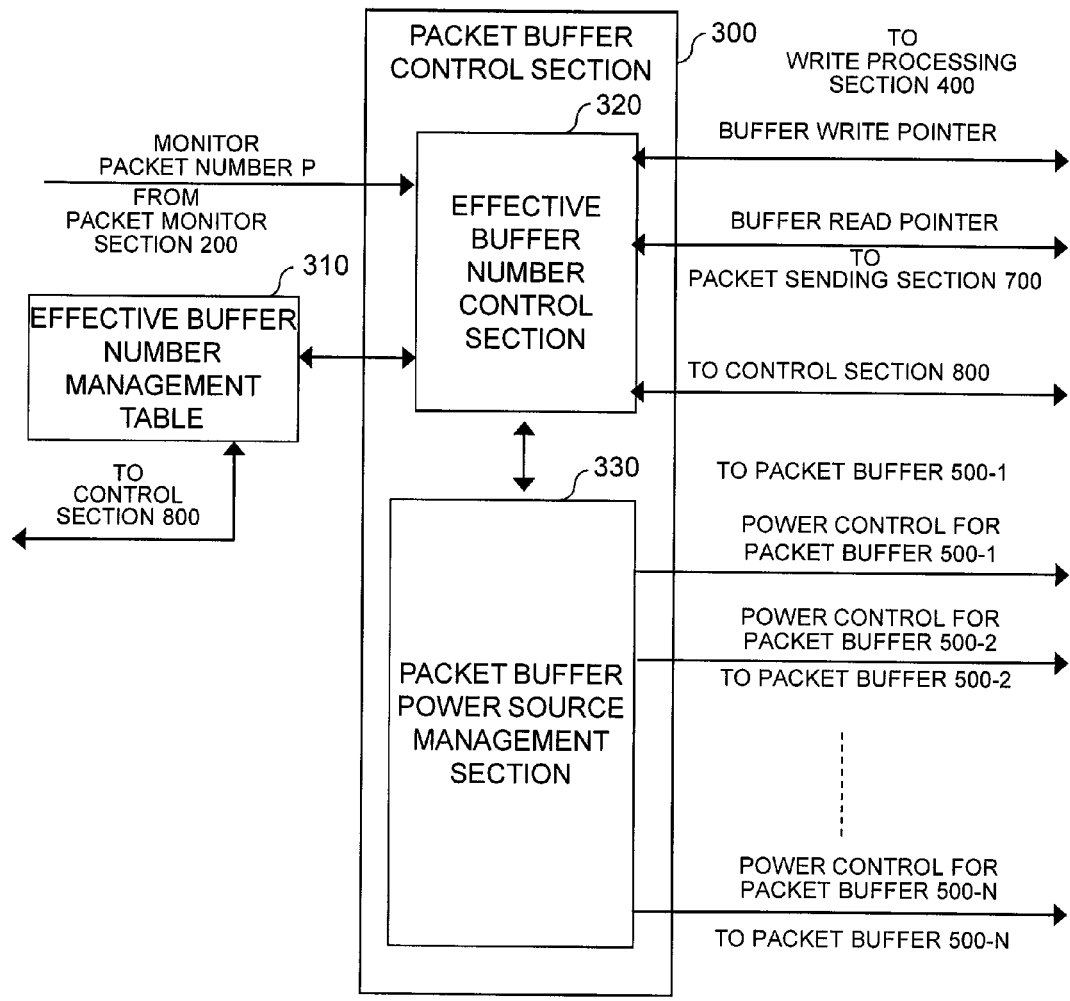
FIG. 3 is an explanatory view showing the configuration of a packet buffer control section according to the embodiment.

FIG. 3 is an explanatory view showing the detailed configuration of the packet buffer control section 300.

The packet buffer control section 300 has an effective buffer number control section 320 and a packet buffer power source management section 330. The effective buffer number control section 320 is connected to the packet monitor section 200, the effective buffer number management table 310, the write processing section 400, the packet sending section 700 and the control section 800. The write pointer is the pointer pointing to the last location of the packet data written into the buffer, and the read pointer is the pointer pointing to the last location of reading the written data. The packet buffer power source management section 330 is connected to the packet buffer 500, and has a function of activating or deactivating the power source or the clock of the packet buffers 500-1 to 500-N (N is an integer of 2 or greater).

The effective buffer number control section 320 receives the monitor packet number P from the packet monitor section 200, and receives the upper limit and the lower limit of the monitor packet number corresponding to the effective buffer number at that point of time from the effective buffer number management table 310. The effective buffer number control section 320 does not change the effective buffer number when the monitor packet number P falls between the lower limit and the upper limit of the monitor packet number corresponding to the effective packet number (lower limit of monitor packet number<P≤upper limit of monitor packet number). If the monitor packet number P exceeds the upper limit of the monitor packet number (first monitor packet number), the effective buffer number control section 320 increases the effective buffer number to correspond to the value of the effective buffer number management table 310. If the monitor packet number P is below the lower limit of the monitor packet number (second monitor packet number), the effective buffer number control section 320 decreases the effective buffer number to correspond to the value of the effective buffer number management table 310. The details of the operation will be given in the explanation of FIG. 9.

FIG. 4 is an explanatory view showing one example of the effective buffer number management table 310.

The lower limit of the monitor packet number is the value of the monitor packet number P that is the basis to decrease the effective buffer number, and the upper limit of the monitor packet number is the value of the monitor packet number P that is the basis to increase the effective buffer number. The effective buffer number control section 320 stores the current effective buffer number, and compares it with the lower limit of the monitor packet number and the upper limit of monitor packet number corresponding to the effective buffer number.

Figure 5:
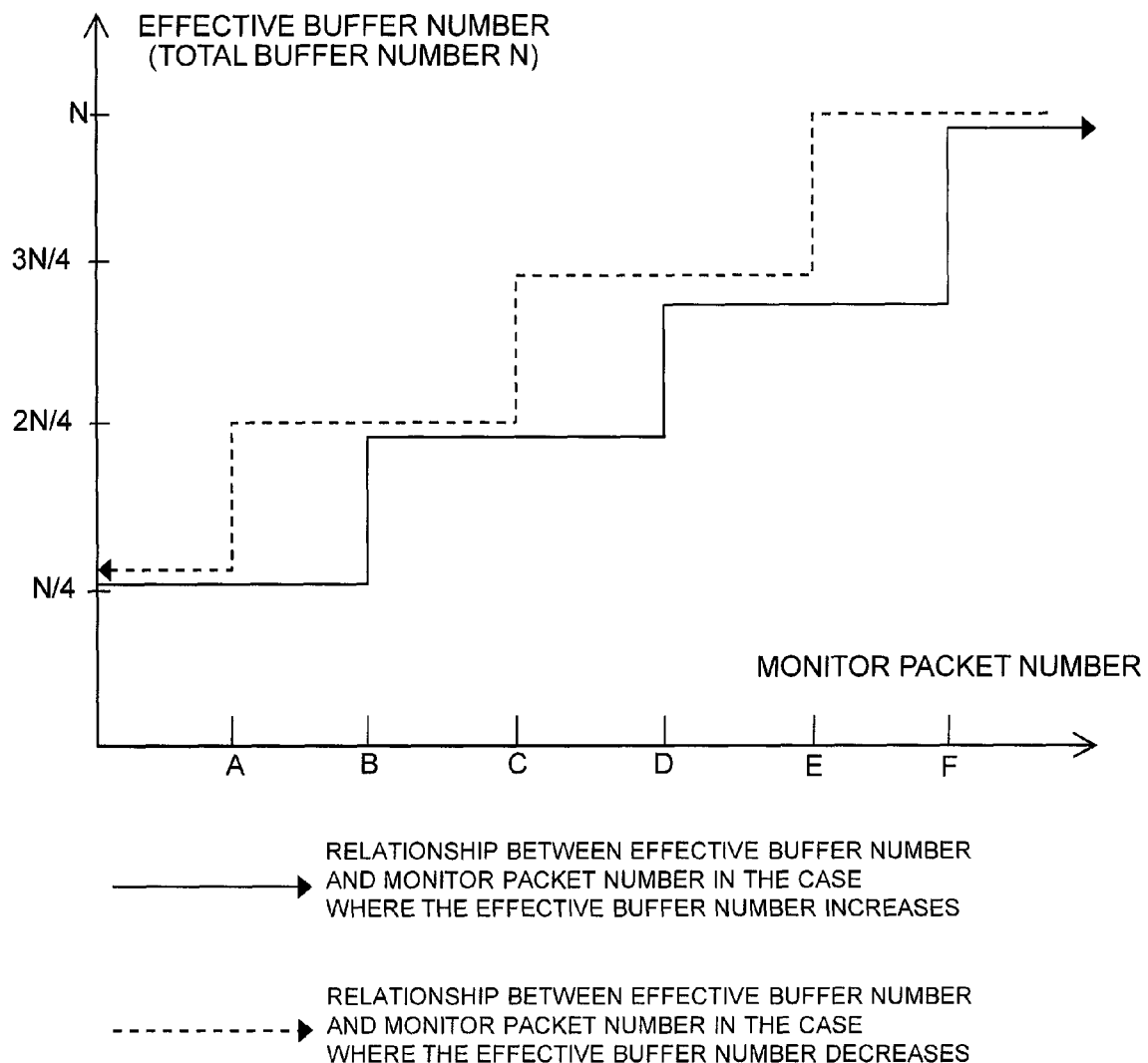
FIG. 5 is an explanatory view showing the relationship between an effective buffer number and a the monitor packet number.

FIG. 5 is an explanatory view showing the relationship between the effective buffer number and the monitor packet number in the case where the effective buffer number is increased and decreased.

The references A to F of the monitor packet number and the effective buffer number correspond to the lower limit of the monitor packet number and the upper limit of the monitor packet number and the effective buffer number as shown in FIG. 4. A solid line represents the relationship between the monitor packet number and the effective buffer number when the effective buffer number is increased, and a dotted line shows the relationship between the monitor packet number and the effective buffer number when the effective buffer number is decreased. Unless different references are provided where the effective buffer number is increased and decreased, if the monitor packet number P arrives at the device 1 frequently near the switching reference of the effective buffer number, the effective buffer number control section 320 repeatedly increases or decreases the effective buffer number, resulting in conversely increased power consumption. Therefore, if a threshold for varying the effective buffer has a margin between the cases where the effective buffer number is increased and decreased, the power consumption can not be increased.

Figure 6:
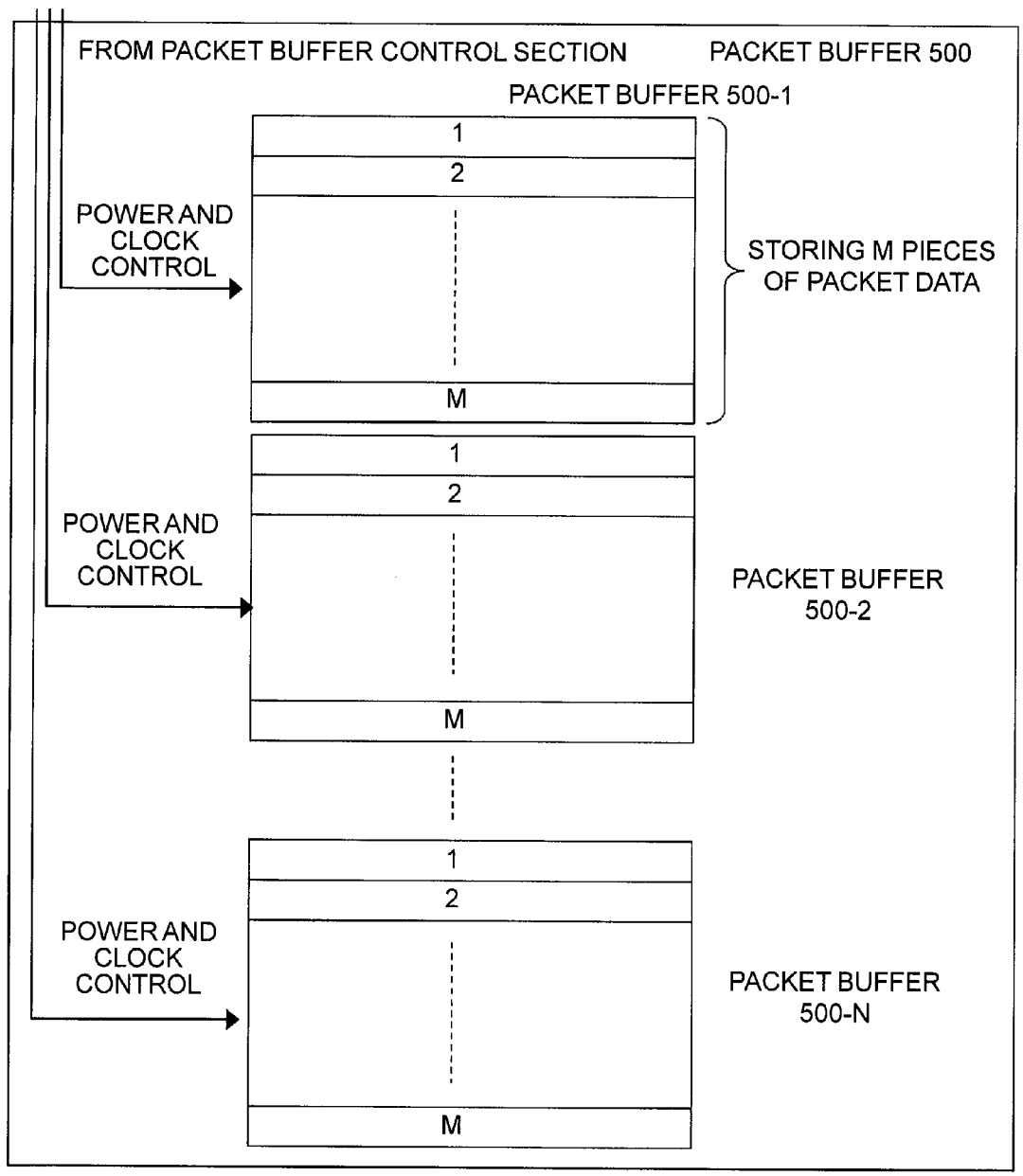
FIG. 6 is an explanatory view showing the configuration of a packet buffer according to the embodiment.

FIG. 6 is an explanatory view showing the detailed configuration of the packet buffer 500. The packet buffer has a plurality of memories (packet buffers 500-1 to 500-N), which are independent of each other and can activate or deactivate the power source or the clock individually. The control of the power source or the clock is made by a signal from the packet buffer power source management section 330. Also, M (M is an integer of 1 or greater) pieces of packet data can be stored in one packet buffer.

Figure 7:
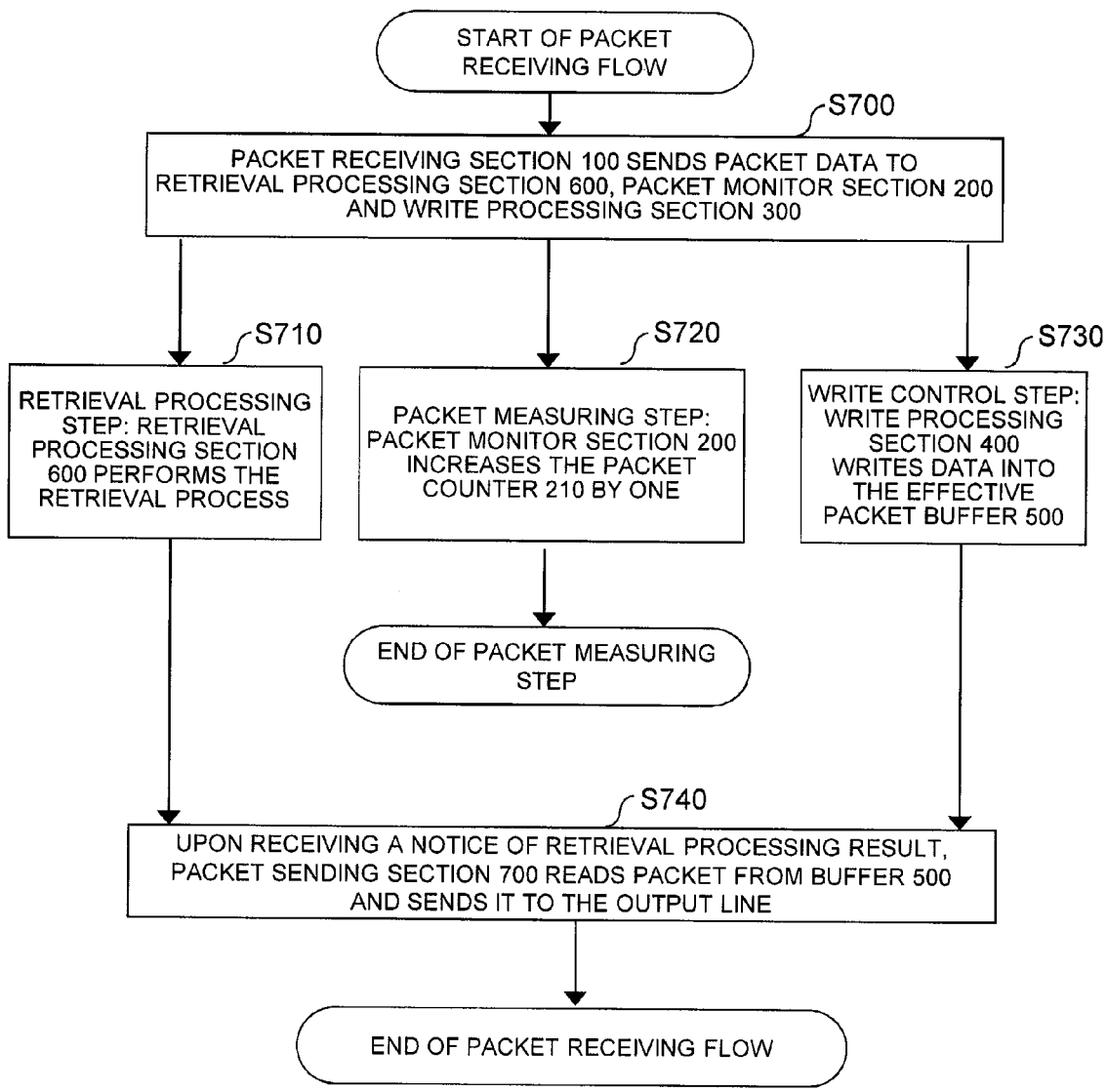
FIG. 7 is a flowchart showing a process for receiving the packet in the switching device.

FIG. 7 is a flowchart showing the operation for receiving the packet in the device.

At the first step S700, the packet receiving section 100 sends the packet data to the retrieval processing section 600, the packet monitor section 200 and the write processing section 400. The overall packet data is not sent, but the packet header and a packet reception notice may be appropriately sent. In the following, three flows of a retrieval processing step (S710), a packet measuring step (S720), and a write processing step (S730) run in parallel, for example.

At the retrieval processing step (S710), the retrieval processing section 600 searches a retrieval table 610 for the packet header as a keyword for retrieval, and decides a destination.

At the packet measuring step (S720), the packet monitor section 200 increases the packet counter 210 by one, and finishes the processing.

At the write control step (S730), the write processing section 400 receiving the packet data from the packet receiving section 100 writes the data into the packet buffer 500. The packet sending section 700 detects a difference between the write pointer and the read pointer, the retrieval processing section 600 notifies the packet sending section 700 that the processing is finished, and the packet sending section 700 performs a process of reading the packet data from the packet buffer and sending the packet to a relevant line (S740).

Figure 8:
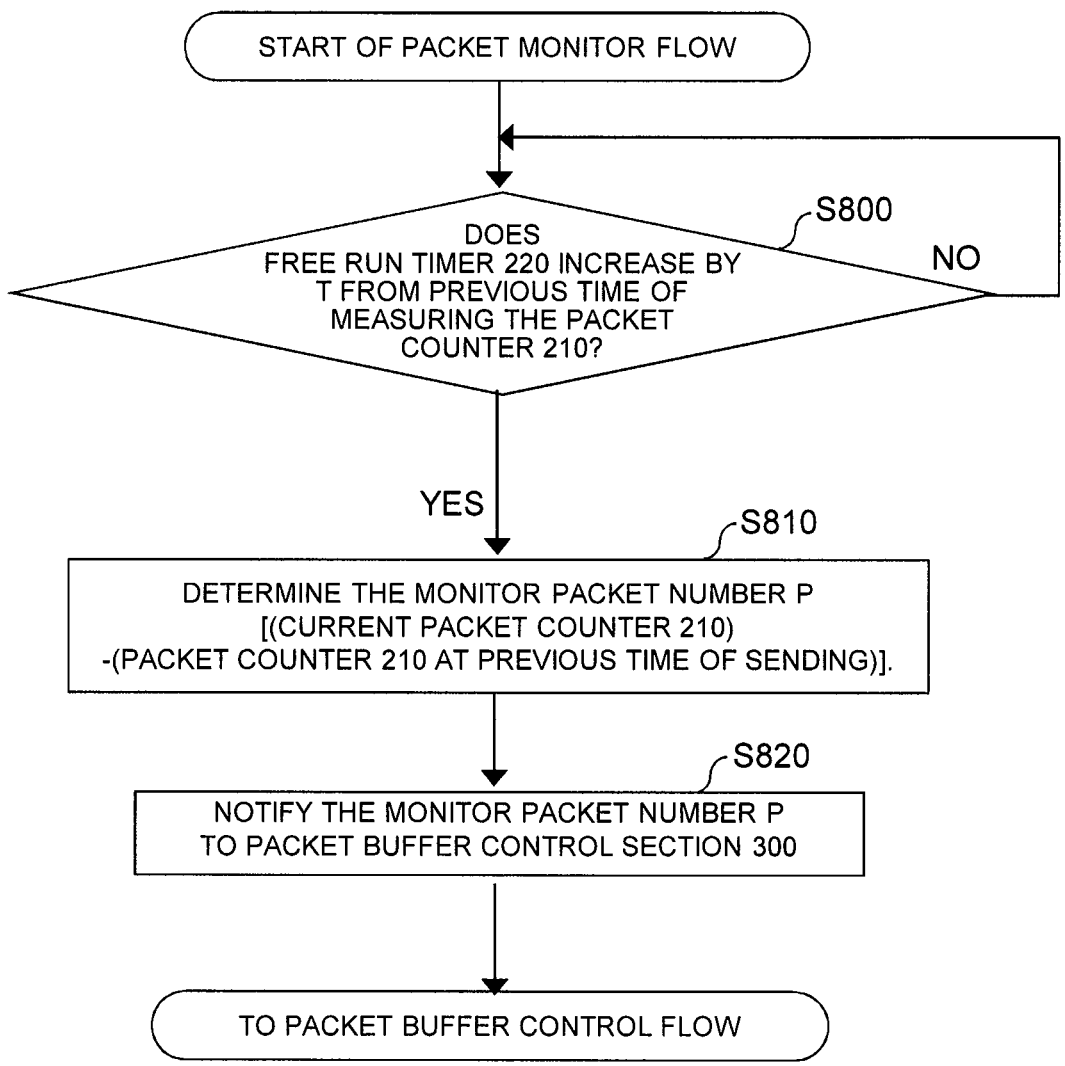
FIG. 8 is a flowchart showing a process for the packet monitor section.

FIG. 8 is a flowchart showing a packet monitor flow.

The packet monitor flow runs independently of the packet receiving flow of FIG. 7. The packet number measuring section 230 determines whether the free run timer 220 is T greater than when measuring the packet counter 210 at the previous time (step S800), in which if the free run timer 220 is not T greater (NO at S800), the packet number measuring section 230 repeatedly determines again whether the free run timer 220 is T greater (S800). If the free run timer 220 is T greater (YES at step S800), the packet number measuring section 230 obtains the monitor packet number $P=[(A1-A0)/T]$ by subtracting the packet counter value (A0) at the previous time of measurement from the current packet counter value (A1), and dividing the counter value by the monitor time T (step S810), and the packet number measuring section 230 notifies the obtained monitor packet number P to the packet buffer control section 300 (step S820). Also, the current packet counter value (A1) is stored as the packet counter value (A0) at the previous time of measurement. If the packet monitor flow (step S820) is ended, a packet buffer control flow (step S900) of FIG. 9 starts.

Figure 9:
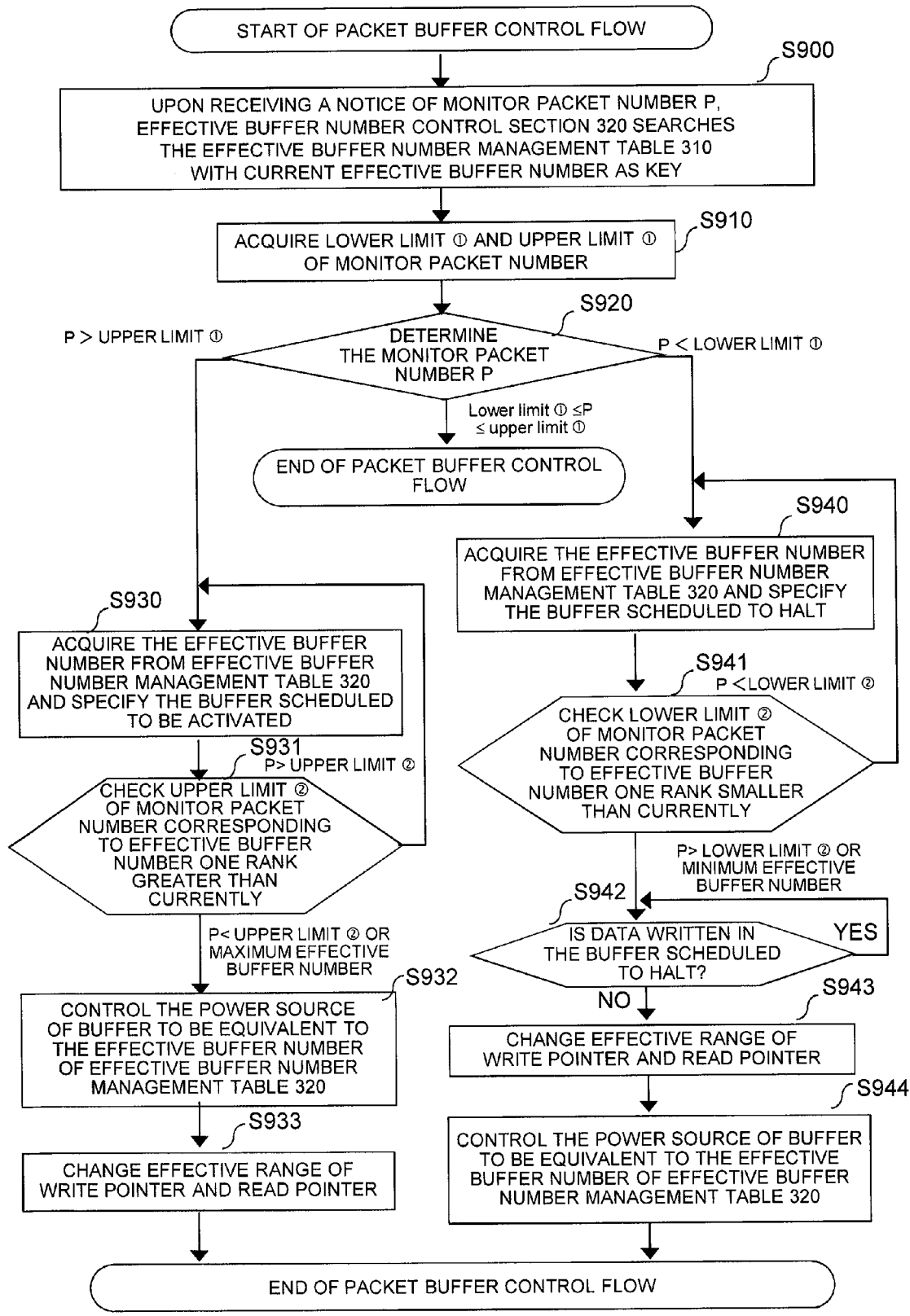
FIG. 9 is a flowchart showing a process for the packet buffer control section.

FIG. 9 is a flowchart showing a packet buffer control flow.

Receiving a notice of the monitor packet number P from the packet monitor section 200, the packet buffer control section 300 searches the effective buffer number management table 310 with the current effective buffer number as the key (S900). The current effective buffer number is stored in advance. The packet buffer control section 300 acquires the upper limit (1) and the lower limit (1) of the monitor packet number corresponding to the effective buffer number at that time from the effective buffer number management table 310 (step S910). The effective buffer number control section 320 determines the effective buffer number from the value of the monitor packet number P notified from the packet monitor section 200, and the upper limit (1) and the lower limit (1) of the monitor packet number in the effective buffer number management table 310 (step S920). For example, if the upper limit (1) of monitor packet number<monitor packet number P, the effective buffer number control section 320 determines the effective buffer number after change from the effective buffer number management table 310, and specifies the buffer scheduled to be activated (S930). On the other hand, when the lower limit of monitor packet number (1)≤monitor packet number P≤upper limit of monitor packet number (1), the processing of the packet buffer control flow is terminated. Also, when monitor packet number P<the lower limit of monitor packet number (1), the effective buffer number control section 320 determines the effective buffer number after change from the effective buffer number management table 310, and specifies the buffer scheduled to be deactivated (S940).

For example, if the monitor packet number exceeds the acquired upper limit (1) (e.g., F) of the monitor packet number, the effective buffer number (e.g., N) of the lower entry in the effective buffer number management table of FIG. 4 is acquired. Also, if the monitor packet number is below the acquired lower limit (1) (e.g., C) of the monitor packet number, the effective buffer number (e.g., N×2/4) of the upper entry in the effective buffer number management table of FIG. 4 is acquired.

Figure 11:
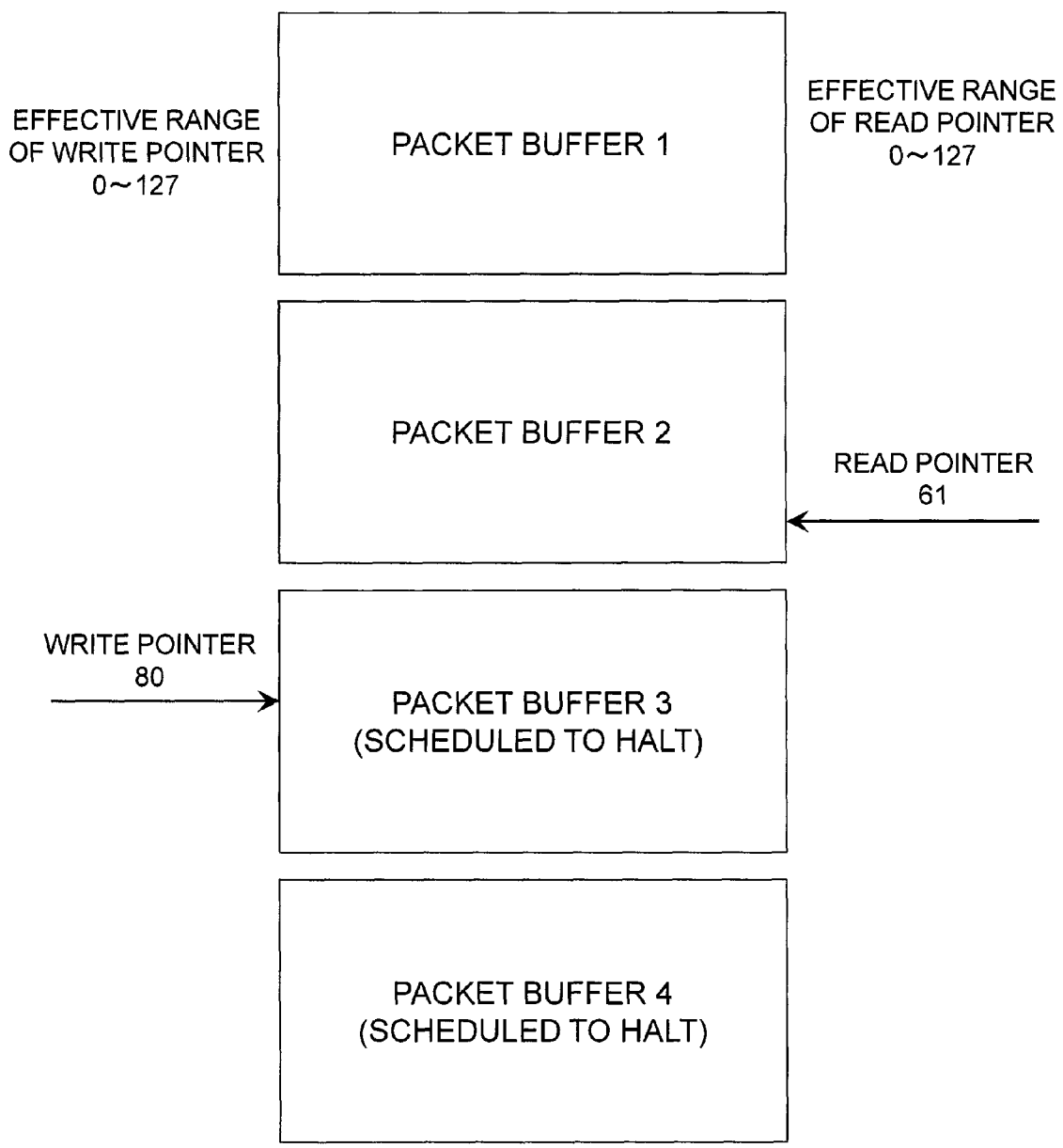
FIG. 11 is an explanatory view showing an example in which a write pointer of FIG. 10 is on a buffer scheduled to be deactivated.

The buffer scheduled to halt may be halted according to the predetermined order of halt, for example, from the buffer on the bottom of FIG. 11. Also, the buffer on the top of FIG. 11 may be halted depending on the positions of the write pointer and the read pointer, or the buffers on both sides may be halted. If the effective range of the write pointer and the read pointer becomes the consecutive values, the management is facilitated. The buffer scheduled to halt can be selected by any appropriate method other than the above method. The buffer scheduled to be activated may be specified in reverse order for the method for specifying the buffer to halt, and can be appropriately selected with the method for specifying the buffer to halt.

At step S931, the effective buffer number control section 320 holds the information of the current effective buffer number, and checks the upper limit (2) of the monitor packet number corresponding to the effective buffer number one rank greater than the current effective buffer number from the effective buffer number management table 310 (S931). In the case of "monitor packet number P>upper limit (2) of monitor packet number for the effective buffer number one rank greater" (P at S931>upper limit (2)), the effective buffer number control section 320 changes the effective buffer number to the effective buffer number further one rank greater by referring to the effective buffer number management table 310, and specifies the buffer scheduled to be activated (S930).

At S931, if "monitor packet number P<upper limit (2) of monitor packet number for the effective buffer number one rank greater" or "the effective buffer number one rank greater is the maximum of the effective buffer number management table 310" (P at S931<upper limit (2) or maximum effective buffer number), the packet buffer power source management section 330 controls the power source or clock of the specified buffer (e.g., turning on the power or supplying the clock) to be equal to the effective buffer number in the effective buffer number management table 310, and activates the buffer (S932). And the effective range of the write pointer and the read pointer is changed to be suitable (S933), and the packet buffer control flow is ended.

At step S941, the effective buffer number control section 320 holds the information of the current effective buffer number, and checks the lower limit (2) of monitor packet number corresponding to the effective buffer number one rank smaller than the current effective buffer number from the effective buffer number management table 310 (S941). In the case of "monitor packet number P<lower limit (2) of monitor packet number for the effective buffer number one rank smaller" (P at S941<lower limit (2)), the effective buffer number control section 320 changes the effective buffer number to the effective buffer number further one rank smaller by referring to the effective buffer number management table 310, and specifies the buffer scheduled to be activated (S940).

At S941, if "monitor packet number P<lower limit (2) of monitor packet number for the effective buffer number one rank smaller" or "the effective buffer number one rank smaller is the minimum of the effective buffer number management table 310" (P at S941>lower limit (2) or minimum effective buffer number), the effective buffer number control section 320 determines whether or not the data is written in the buffer scheduled to halt (S942). If the data is written, the buffer scheduled to halt is monitored again (YES at S942), or if the data is not written in the buffer scheduled to halt (NO at S942), the effective buffer number control section 320 changes the effective range of the write pointer and the read pointer to the value corresponding to the buffer scheduled to halt (S943). Also, the packet buffer power source management section 330 controls the power source or clock of the specified buffer (e.g., turning off the power or stopping the supply of clock) to be equal to the effective buffer number in the effective buffer number management table 310 to halt the buffer (S944), and the packet buffer control flow is ended.

A method for allowing the effective buffer number control section 320 to determine whether or not the data is written in the buffer scheduled to halt will be described below using FIGS. 10, 11, 12 and 13.

Figure 10:
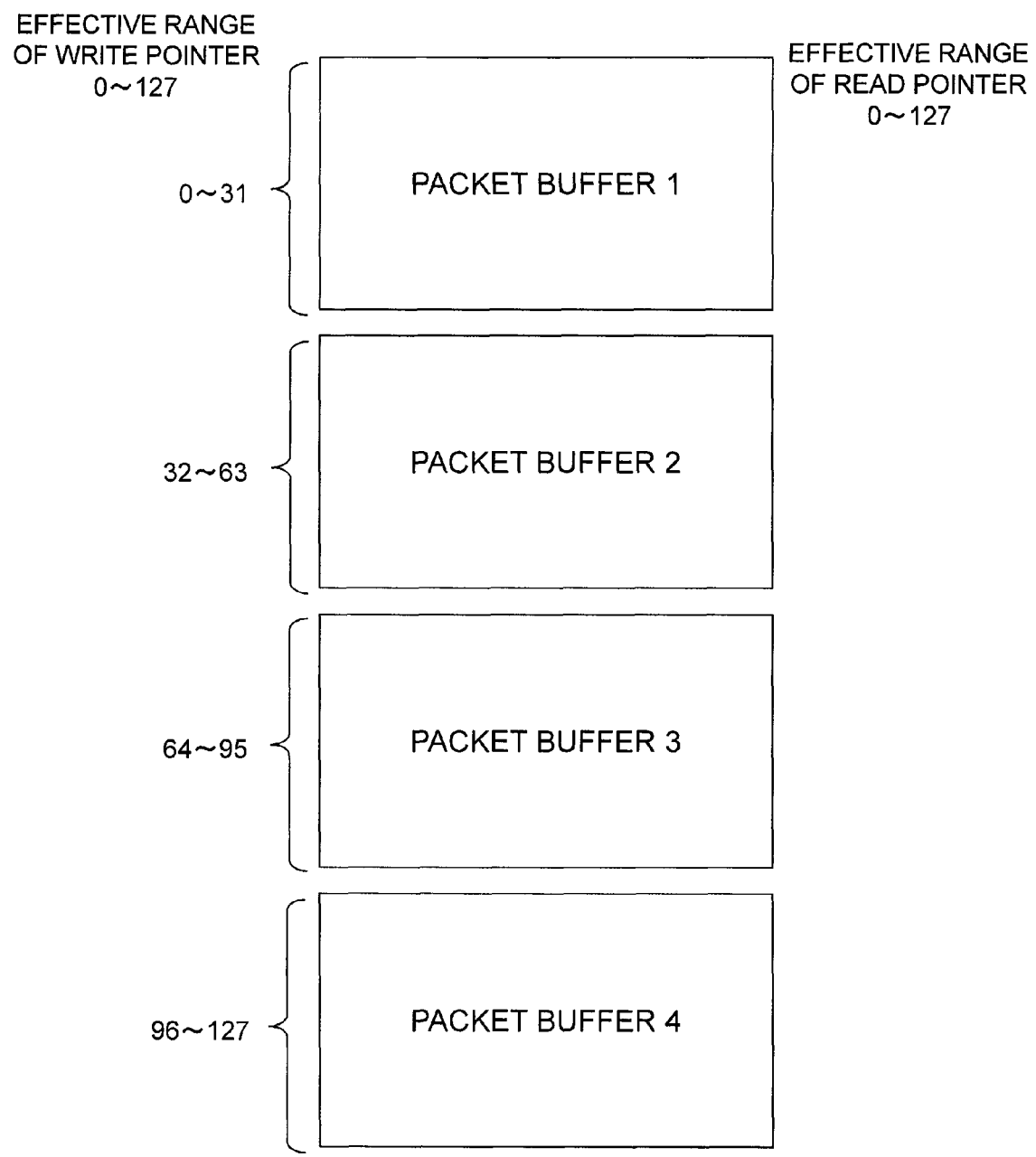
FIG. 10 is an explanatory view showing one example of the configuration of a packet buffer.

FIG. 10 is a view for explaining the method for discriminating whether or not the data is written in the buffer scheduled to halt at step S951.

In this example, the packet buffer 500 has four memories operating independently of each other. Since thirty two pieces of packet information can be written in one packet buffer, a total of 128 pieces of packet information can be stored in this case. The write pointer takes the value of "0" when the device is initiated, and every time the write processing section 400 writes the packet, it is incremented in the way of "1, 2, 3, . . . ." The read pointer also takes the value of "0" when the device is initiated. The packet sending section 700 judges that the packet data is written in the packet buffer 500, if a difference in the value between the write pointer and the read pointer is one or greater. If the retrieval result of the retrieval processing section 600 is notified to the packet sending section 700, the packet sending section 700 reads the data from the packet buffer 500, sends the packet to the line, and increments the read pointer by one. If the effective range is set from 0 to 127, the write pointer and the read pointer return to "0" if the 128 packets arrive at the device, and are incremented again in the way of "1, 2, 3, . . . ."

Figure 12:
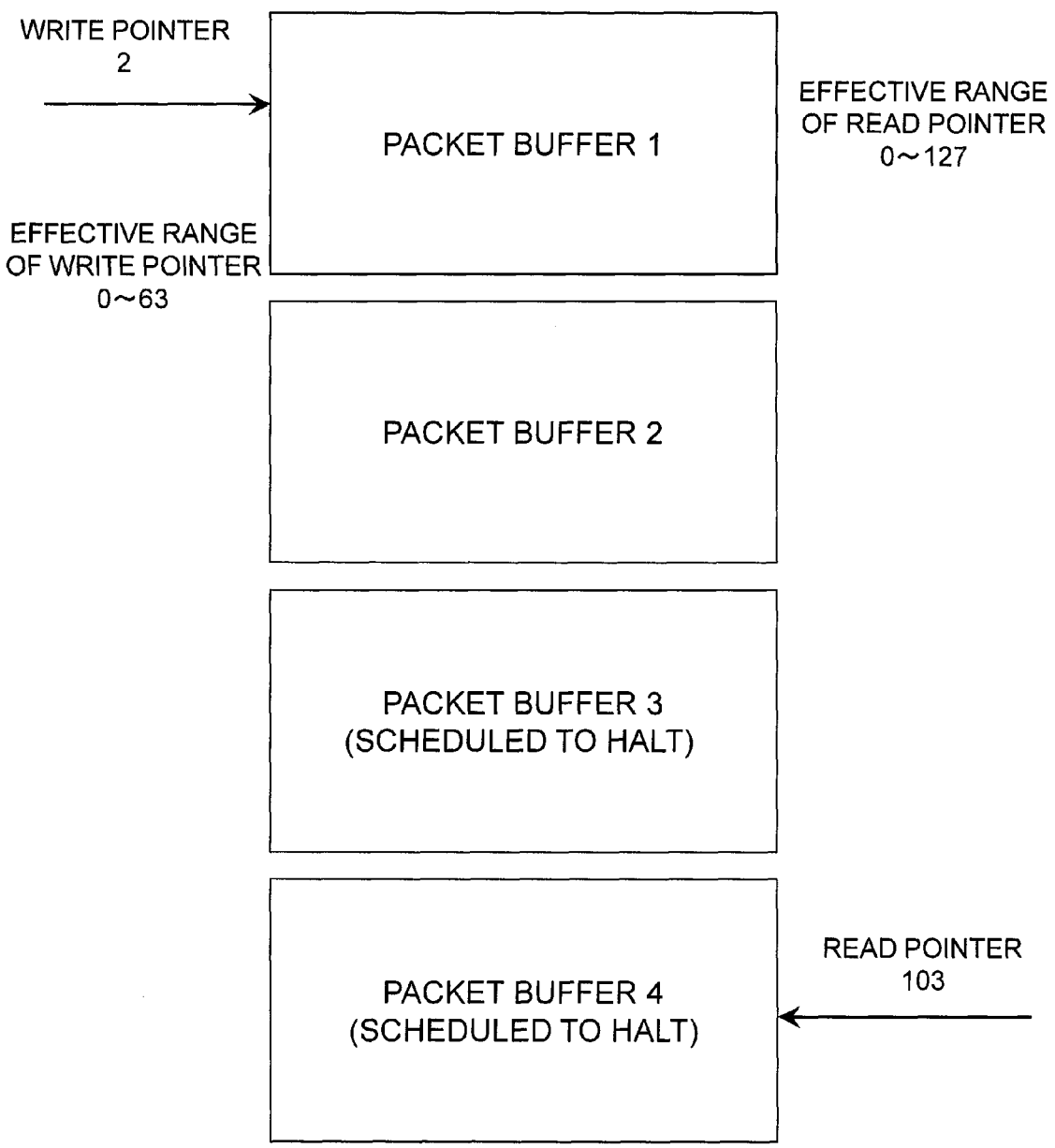
FIG. 12 is an explanatory view showing an example in which a read pointer of FIG. 10 is on a buffer scheduled to be deactivated.
Figure 13:
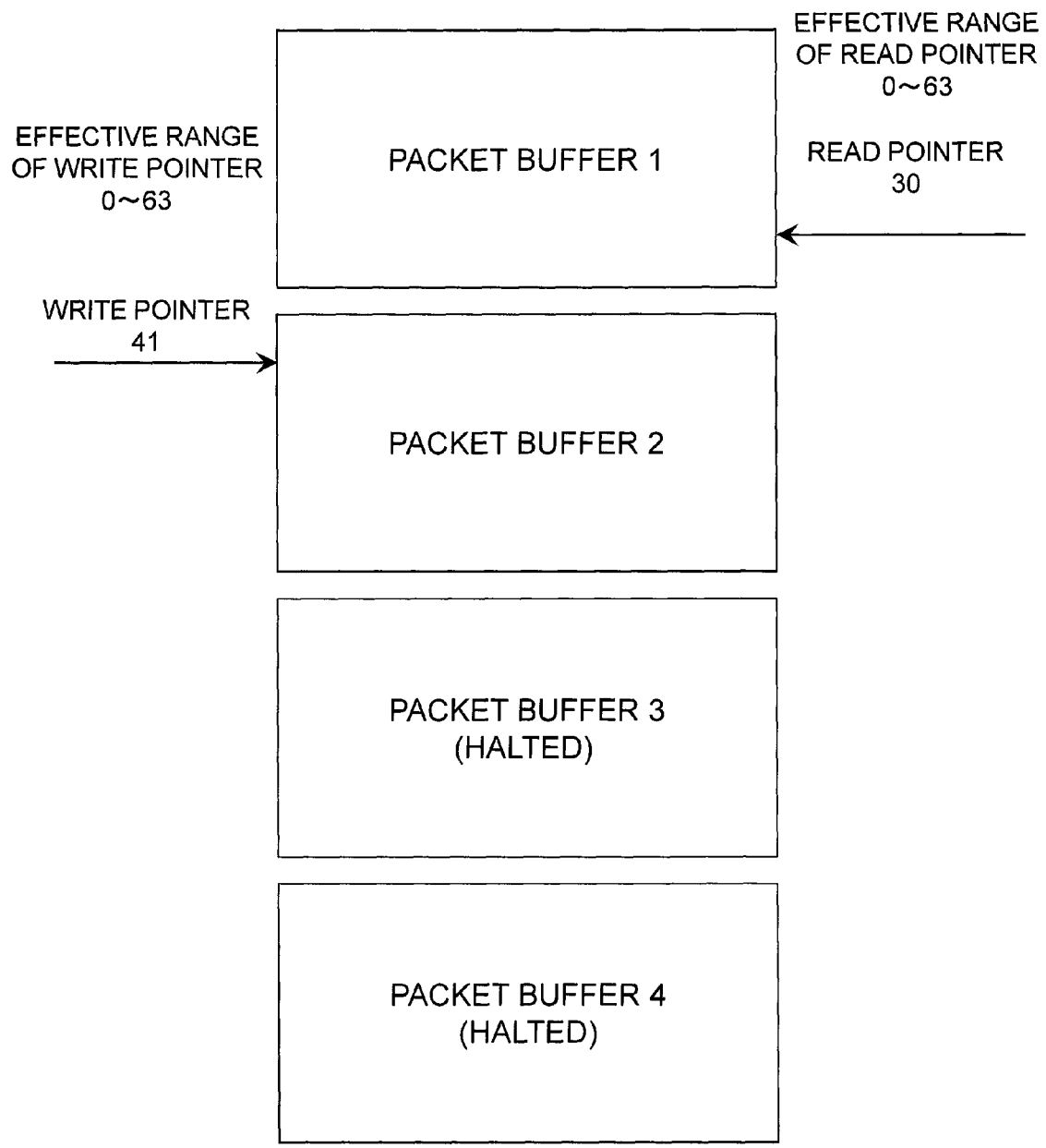
FIG. 13 is an explanatory view showing an example in which the write point and the read pointer of FIG. 10 is not on the buffer scheduled to be deactivated.

FIGS. 11 to 13 are explanatory views showing the operation of the write pointer and the read pointer in reducing the effective buffer number, in which the operation is shown in time series.

FIG. 11 is a view for explaining a combination example of the write pointer and the read pointer. The packet buffers 3 and 4 are packet buffers scheduled to halt. The write pointer "80" is in the packet buffer 3 scheduled to halt, and the read point is "61". In this way, if the write pointer is in the buffer scheduled to halt, and the read pointer is less than or equal to the write pointer, the effective buffer number control section 320 monitors the data of the buffer in the status quo without changing the write pointer and the read pointer (YES at step S951).

If the write pointer and the read pointer are equivalent and the write pointer and the read pointer are on the packet buffer scheduled to halt, the effective buffer number control section 320 tries to halt a part of the packet buffer, but if the packet does not arrive at the device, the write pointer and the read pointer do not move, whereby there is possibility that the packet buffer can not be halted indefinitely.

Thus, the packet sending section 700 flows a plurality of dummy packets to move the write pointer and the read pointer from the buffer scheduled to halt, and move the write pointer from the buffer scheduled to halt to the other buffer, whereby the packet buffer power source management section 330 can control the buffer to turn off.

More specifically, if the packet counter 210 is not varied for a certain period of time, the packet number measuring section 230 notifies the control section 800 that the packet does not arrive at the device for the certain period of time. The control section 800 receiving the notice flows the dummy packet to the packet receiving section 100. The packet receiving section 100 transfers the registered packet data to the write processing section 400 and the retrieval processing section 600. The retrieval processing section 600 notifies the packet sending section 700 to dispose of the dummy packet, and the packet sending section 700 receiving the notice disposes of the dummy packet. The dummy packet may not be counted as the monitor packet number in the packet monitor section 200. In this way, the write pointer and the read pointer are moved from the buffer scheduled to halt by varying the write pointer and the read pointer without transferring the dummy packet to the outside of the device, and for example, when the write pointer and the read pointer are moved onto the effective buffer (e.g., when they become 0), the packet buffer power source management section 330 can control the buffer to turn OFF.

FIG. 12 is a view for explaining a combination example of the write pointer and the read pointer. The write pointer is "2" and the read pointer is "103". Since the write pointer is on the buffer for use after changing the effective buffer number, the packet buffer control section 320 changes the range of the write pointer to "0 to 63". Since the read pointer is on the packet buffer 4 scheduled to halt, the packet buffer power source management section 330 does not put the packet buffers 3 and 4 in a halt state. Also, the effective buffer number control section 320 does not change the range of the read pointer. The packets are successively read in accordance with the read pointer, and when the read pointer is moved onto the effective buffer, the effective range of the read pointer is changed to from 0 to 63.

FIG. 13 is a view for explaining a combination example of the write pointer and the read pointer. The write pointer is "41" and the read pointer is "30". Since the write pointer and the read pointer are on the buffer for use after changing the effective buffer number, the effective buffer number control section 320 changes the range of the write pointer and the read pointer to "0 to 63". And because all the packet data of the packet buffers 3 and 4 scheduled to halt have been read, the buffer memory power source management section 330 puts the packet buffers 3 and 4 in the halt state.

Figure 33:
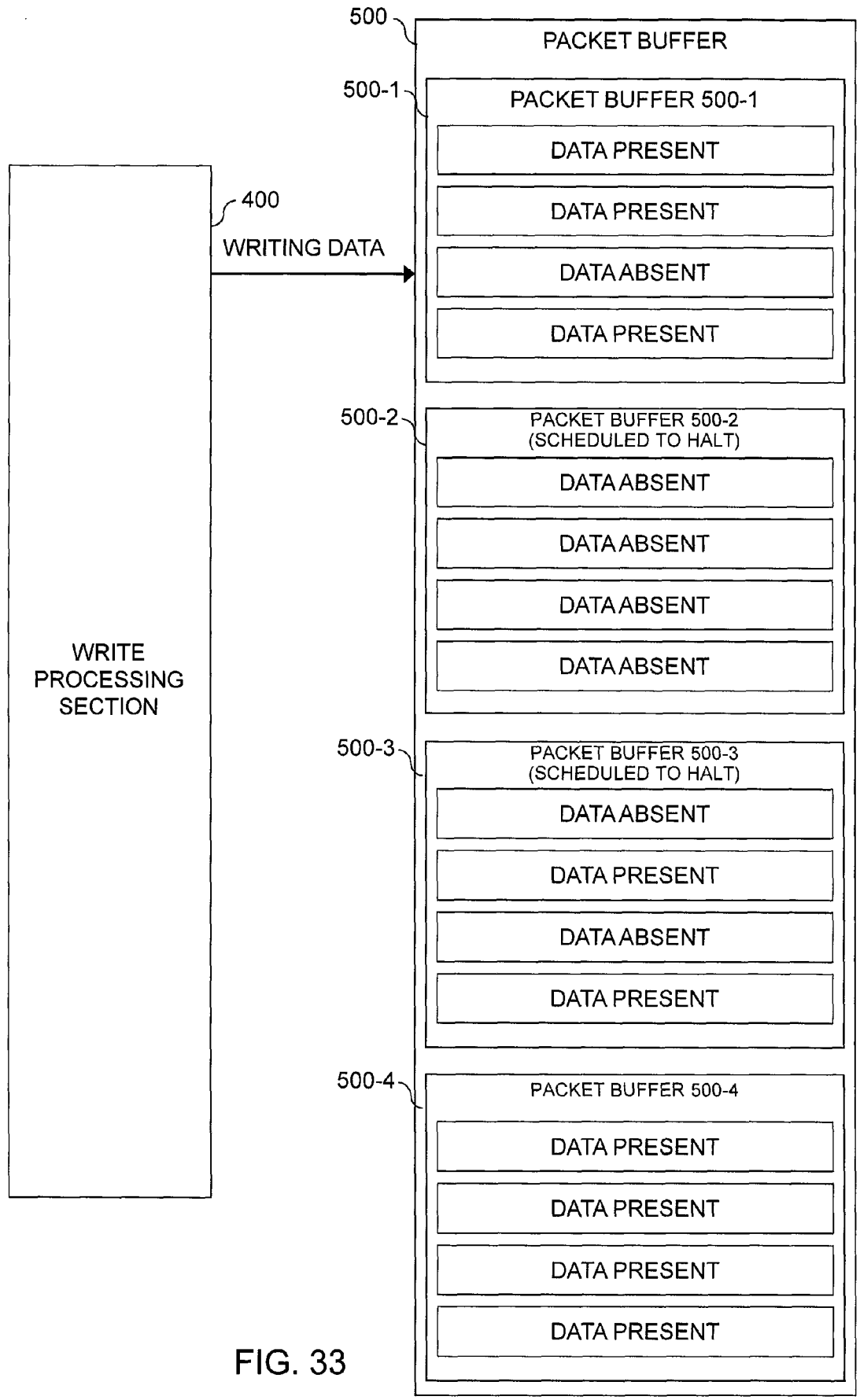
FIG. 33 is a view for explaining one example of another control method for a packet buffer 500.

FIG. 33 is a view for explaining another control method for the packet buffer 500.

For the packet buffer 500, the write processing section 400 holds the information of the written packet buffer 500. If the packet data is transferred to the write processing section 400, the write processing section 400 selects an empty area to write and notifies the written area via the packet buffer control section 300 to the packet sending section 700, and the packet sending section 700 reads the relevant information from the packet buffer 500 and transfers it to the output line.

In this control method, the packet buffer control section 300 may select the buffer to halt from among the buffers with less write (packet buffer 500-3), or the unwritten buffers (packet buffer 500-2). If the data is not written in the packet buffer scheduled to halt, the packet buffer control section 300 can promptly put the packet buffer 500 in the halt state. Even if the data is written in the packet buffer scheduled to halt, the packet buffer 500 can be put in the halt state in a shorter time than the control method of FIGS. 10 to 13, whereby it is unnecessary to flow the dummy packet as described in connection with FIG. 11.

With this embodiment, it is possible to reduce the power consumption by controlling the feeding of power or the supply of clock to a plurality of packet buffers depending on the received packet amount.

2. Second Embodiment

A second embodiment for reducing the power consumption by controlling the feeding of power or the supply of clock to a plurality of table memories making up the retrieval table depending on the number of entries for use will be described below.

Figure 14:
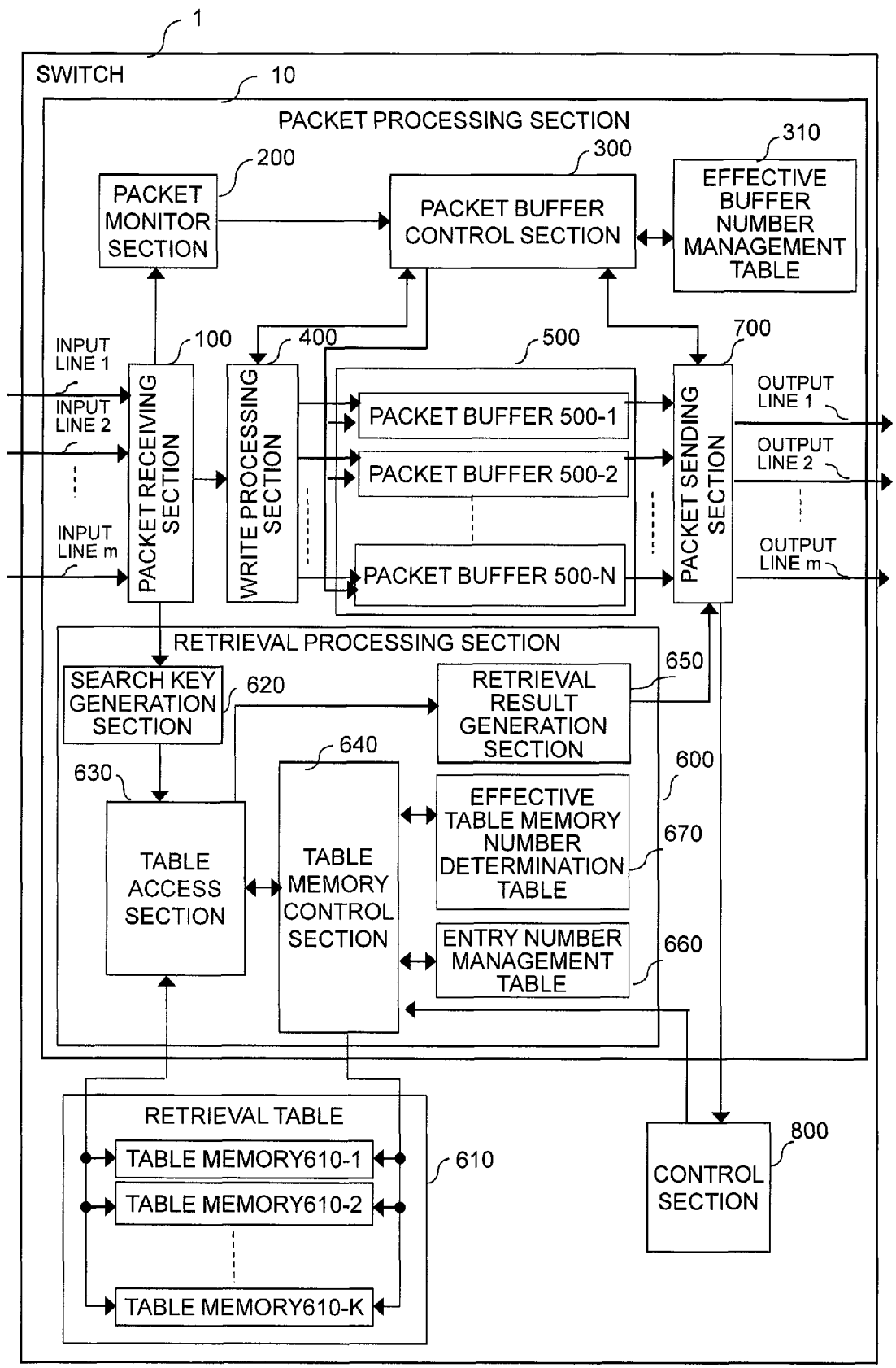
FIG. 14 is an explanatory view showing the configuration of a switching device 1 according to a second embodiment of the invention.

FIG. 14 is an explanatory view showing the configuration of a switch according to this embodiment. The internal configuration of the retrieval processing section 600 and the retrieval table 610, unlike the configuration as described in connection with FIG. 1, is shown in more detail. Also, the connection relationship between the packet sending section 700 and the control section 800 and the connection relationship between the control section 800 and the retrieval processing section 600 are explicitly shown. The other configuration is the same as in FIG. 1.

The retrieval processing section 600 has a search key generation section 620, a table access section 630, a table memory control section 640, a retrieval result generation section 650, an entry number management table 660, and an effective table memory number determination table 670. The operation of each section will be described later using FIGS. 15 to 24.

The packet sending section 700 is connected to the output lines 1 to N and the control section 800. The packet sending section 700 sends the packet data to the output lines 1 to N or the control section 800 in accordance with the destination generated by the retrieval result generation section 650 within the retrieval processing section 600.

The control section 800 is connected to the table memory control section 640 within the retrieval processing section 600. The control section 800 receives a packet for routing protocol operating on a layer 3 of the network hierarchy from the packet sending section 700, recalculates the network configuration based on the network path information within the packet, and determines the presence or absence of adding or deleting the destination entry in a destination table such as Internet Protocol Version 4 (IPv4) or IP Version 6 (IPv6) stored in the retrieval table 610. If addition or deletion is judged to be necessary, the control section 800 sends a request for adding or deleting the destination entry and the content of the entry to be added or deleted to the table memory control section 640 within the retrieval processing section 600. Also, in the case of a filter table or priority control table, the configuration of the filter table or priority control table is changed via a control terminal of the device in accordance with the input from the device manager. The control section 800 transforms the change of table organization into a request for adding or deleting the entry, and sends the request for adding or deleting the entry in the filter table or priority control table and the content of the entry to be added or deleted to the table memory control section 640 within the retrieval processing section 600.

The retrieval table 610 has a plurality of table memories 610-1 to 610-K. For each table memory 610-$j$ ($j$ is the natural number from 1 to K), the table memory control section 640 controls the presence or absence of feeding the power or supplying the clock individually. Also, if a part of the retrieval table 610 has the CAM, whether or not it is included in the object at the time of retrieval may be controlled as the other control method than the previous control for the presence or absence of feeding the power or supplying the clock. A plurality of table entries can be stored in one table memory 610-*j*.

Figure 15:
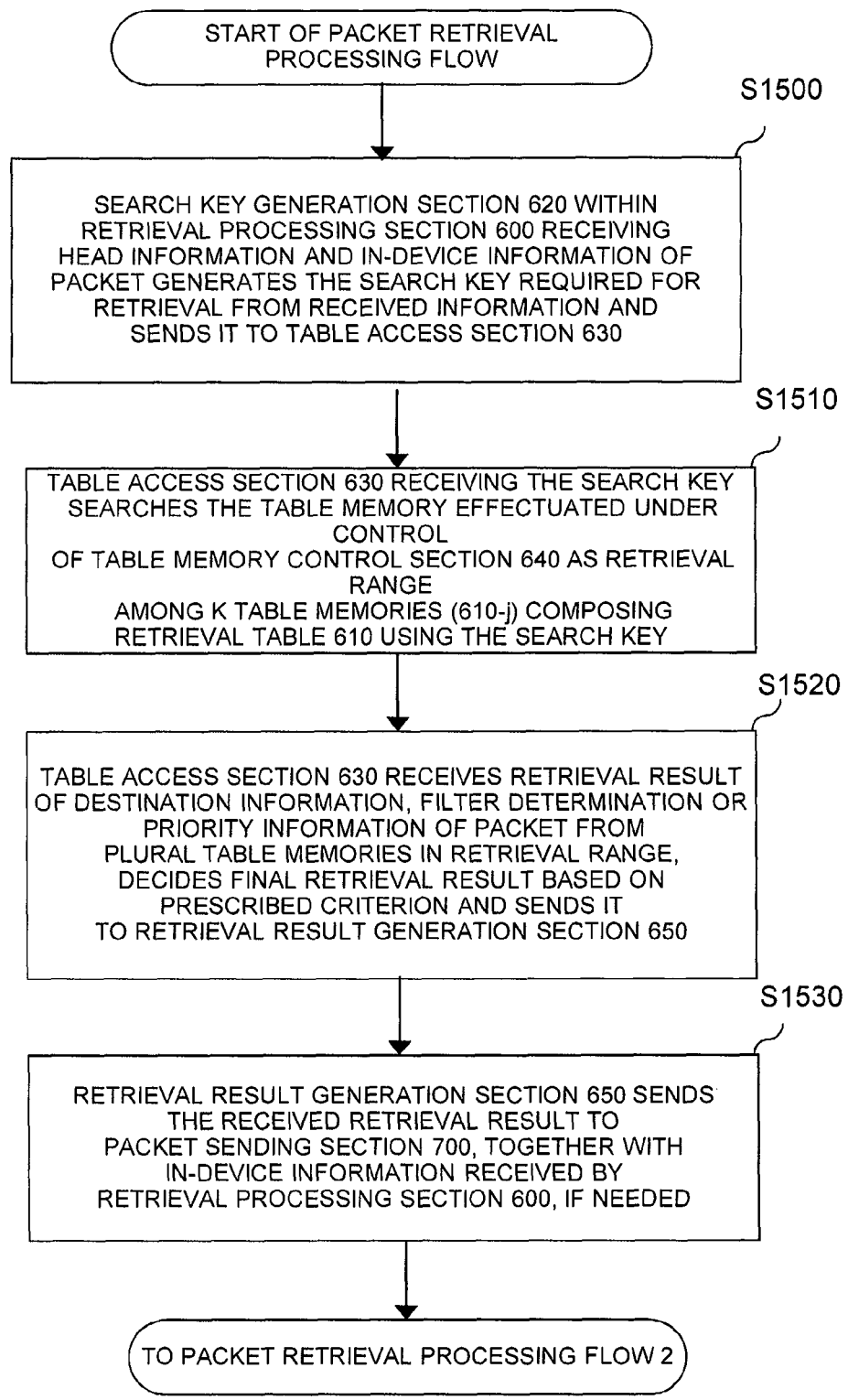
FIG. 15 is a flowchart showing a retrieval process of the device in receiving the packet.

FIG. 15 is a flowchart showing a retrieval processing operation in receiving the packet according to this embodiment.

The search key generation section 620 within the retrieval processing section 600 receiving the header information and in-device information of the packet from the packet receiving section 100 generates a search key required for prescribed retrieval from the received information, and sends it to the table access section 630 (step S1500).

The table access section 630 receiving the search key searches the table memory effectuated under the control of the table memory control section 640 among the K table memories (610-*j*) making up the retrieval table 610, as the retrieval range, using the search key (step S1510). Herein, the state where the table memory is effectuated means the state where the power is supplied to the table memory 610-*j*, or the clock is supplied to the table memory 610-*j*, or the table memory 610-*j* is designated as the retrieval range if a part of the retrieval table has the CAM, for example.

The table access section 630 receives the retrieval results such as the destination information, filter determination and priority information of the packet corresponding to the search key from the plurality of table memories 610 in the retrieval range, decides the final retrieval result based on a predetermined criterion, and sends it to the retrieval result generation section 650 (step S1520). Herein, the predetermined criterion is the criterion on which retrieval result is determined as the final retrieval result among the plurality of retrieval results in the configuration where the table access section 630 sends a retrieval request to the plurality of table memories individually and receives the retrieval result from each of the table memories. As an example of the criterion, the table memories are numbered, and the retrieval result with younger number is made the final retrieval result.

The retrieval result generation section 650 sends the received retrieval result to the packet sending section 700, together with the in-device information received by the retrieval processing section 600, if necessary (step S1530).

Figure 16:
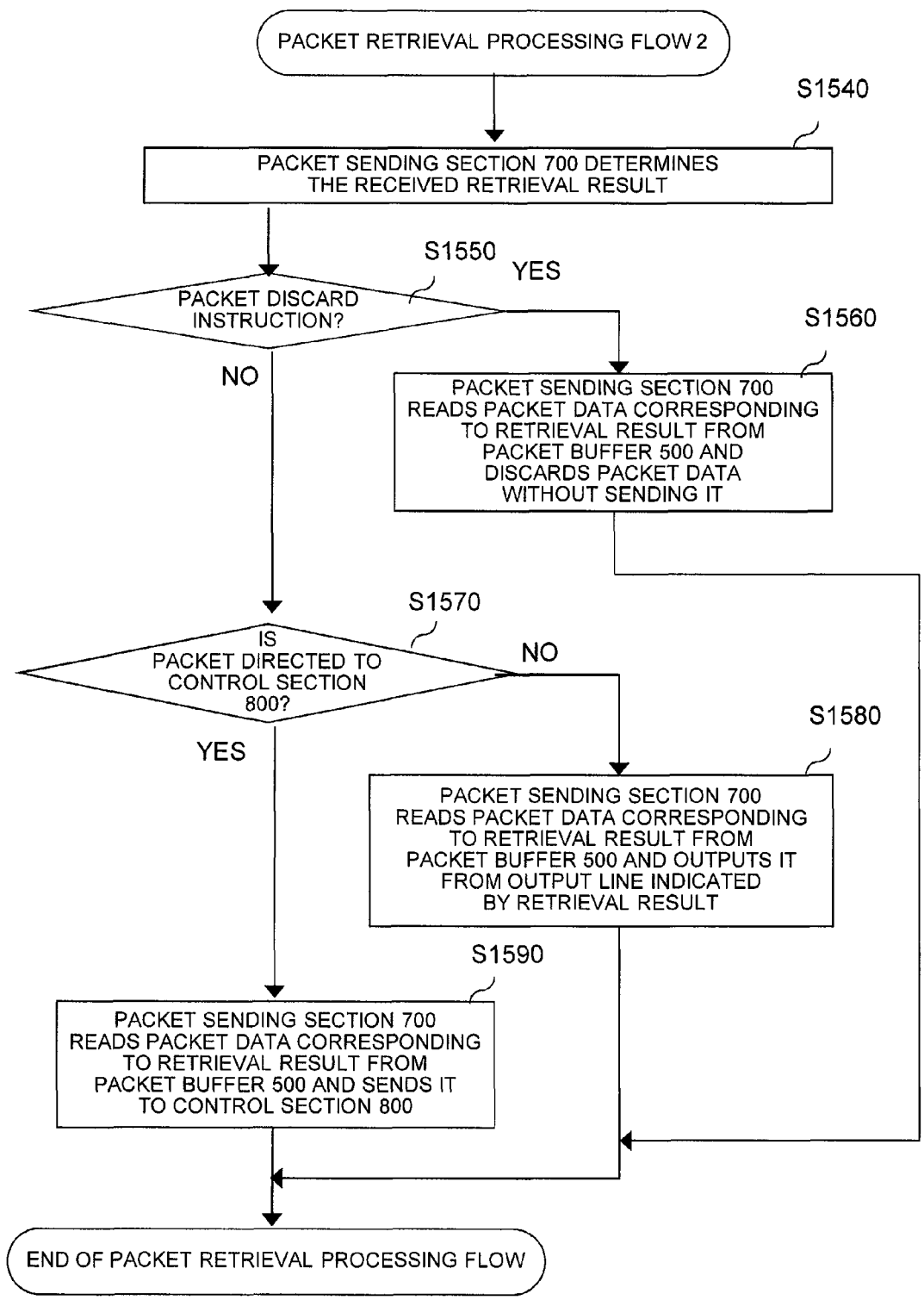
FIG. 16 is a flowchart showing the retrieval process continued from FIG. 15.

FIG. 16 is a flowchart showing the retrieval processing operation continued from FIG. 15 according to this embodiment.

The packet sending section 700 determines the received retrieval result (step S1540). First of all, it is determined whether or not the retrieval result is a discard instruction (step S1550). If the retrieval result is the discard instruction (YES at step S1550), the packet sending section 700 reads the packet data corresponding to the retrieval result from the packet buffer 500, and discards the packet data without sending it anywhere (step S1560). If the retrieval result is not the discard instruction (NO at step S1550), it is determined whether or not the retrieval result is directed to the control section 800 (step S1570). If the retrieval result is not directed to the control section 800 (NO at step S1570), the packet sending section 700 reads the packet data corresponding to the retrieval result from the packet buffer 500, and outputs it from the output line indicated by the retrieval result (step S1580). On the other hand, if the retrieval result is directed to the control section 800 (YES at step S1570), the packet sending section 700 reads the packet data corresponding to the retrieval result from the packet buffer 500, and sends it to the control section 800 (step S1590).

FIG. 17 is a view showing one example of the entry number management table 660.

The entry number management table 660 has the entries for each table classification stored within the device. In FIG. 17, as one example, an IPv4 uni-cast table entry, an IPv4 multi-cast table entry, an IPv6 uni-cast table entry, an IPv6 multi-cast table entry, a Media Access Control (MAC) address table entry for use in the packet transfer on the layer 2 of the network hierarchy, and a filter table entry are set.

One entry of the entry number management table 660 includes a table classification field for setting the table classification indicating the classification of a plurality of different tables owned by the device, an assigned table memory field for setting the table memory number assigned to a certain table classification, a use entry number field for setting the entry number in current use for each table classification, and an effective table memory number field for setting the effective table memory number for each table classification.

In FIG. 17, as one setting example, all the table memories including the table memories 610-1 to 610-K are assigned to the IPv4 uni-cast table, in which the current use entry number is e_c and the effective table memory number is m_ac. In this case, "610-1 to 610-K" is set in the assigned table memory for the IPv4 uni-cast table entry in the entry number management table 660, "e_c" is set in the use entry field, and "m_ac" is set in the effective table memory number field. For the other table entries, "unassigned" is set in all the assigned table memory fields, "0" is set in the use entry number fields, and "0" is set in the effective table memory number fields.

A setting process for the entry number management table 660 will be described later using FIGS. 20 to 23.

FIG. 18 is a view showing one example of the effective table memory number determination table 670.

The effective table memory number determination table 670 has a plurality of entries. Each entry includes an entry number field for setting the entry number of identifying the entry, a use entry number lower limit field for setting the lower limit of the use entry number, a use entry number upper limit field for setting the upper limit of the use entry number, and an effective table memory number field for setting the effective table memory number. The use entry number lower limit is the value that becomes the basis for decreasing the effective table memory number, and the use entry number upper limit is the value that becomes the basis for increasing the effective table memory number. The effective table memory number is the table memory number to be effectuated when the current use entry number lies between the use entry number lower limit and the use entry number upper limit. The effective table memory number determination table, not specifically shown, is provided for each of the plurality of different tables owned by the device.

Figure 19:
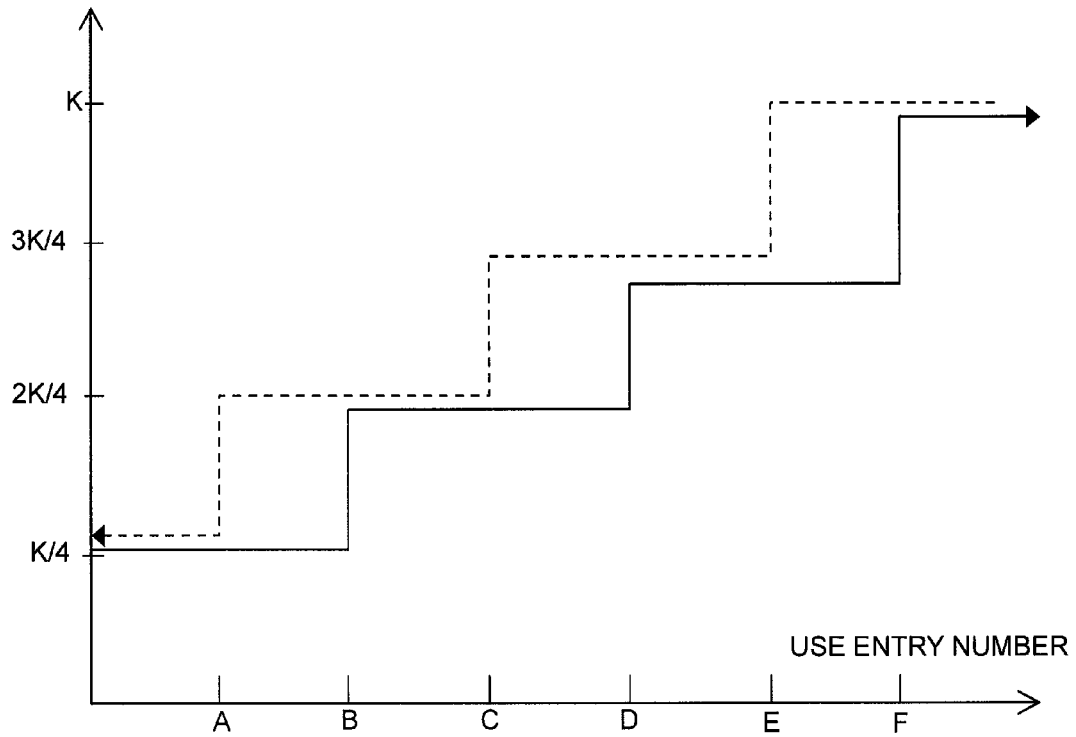
FIG. 19 is an explanatory view showing the relationship between an effective table memory number and a use entry number.

FIG. 19 is a view showing the relationship between the effective table memory number and the use entry number when the effective table memory number increases and decreases, like one setting example of the effective table memory number determination table 670 as shown in FIG. 18. A solid line represents the relationship between the use entry number and the effective table memory number when the effective table memory number increases. Also, a dotted line shows the relationship between the use entry number and the effective table memory number when the effective table memory number decreases. The reason why the different use entry number upper limit and use entry number lower limit are set depending on whether the effective table memory number increases or decreases is as follows. In the case where the use entry number upper limit and the use entry number lower limit are set at the same value, if the use entry number frequently increases or decreases near the set value, the table memory control section 640 increases or decreases the effective table memory number, so that there is possibility that the power consumption increases. The use entry number upper limit and the use entry number lower limit that are the conditions for changing the effective table memory are set to different values depending on whether the effective table memory number increases or decreases, whereby it is possible to avoid the frequent increase or decrease of the effective table memory number.

Figure 20:
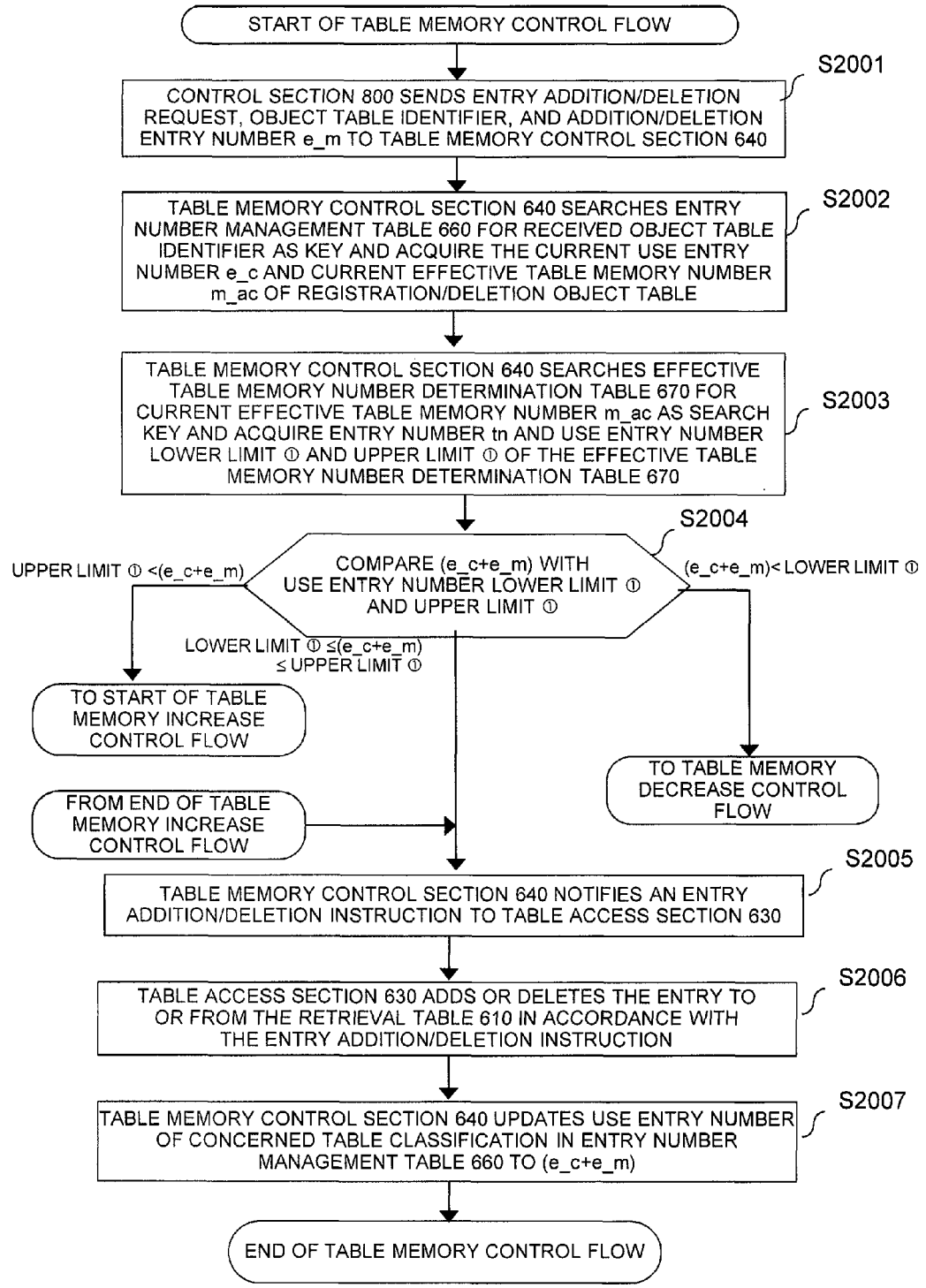
FIG. 20 is a flowchart showing a process for a table control section.

FIG. 20 is a flowchart showing the table memory control flow.

The control section 800 sends a request for adding or deleting the entry, an object table identifier (table classification), and the addition or deletion entry number e_m to the table memory control section 640 (step S2001). The value of e_m is plus for addition, or minus for deletion. The table memory control section 640 searches the entry number management table 660 for the received object table identifier as the key, and acquires the current use entry number e_m_and the current effective table memory number m_ac of the registration or deletion object table (step S2002). Next, the table memory control section 640 searches the effective table memory number determination table 670 for the current effective table memory number m_ac as the search key, and acquires the entry number to and the use entry number lower limit and upper limit of the relevant entry in the effective table memory number determination table 670 (step S2003). To distinguish them from the upper limit and the lower limit of FIGS. 21 and 22 as hereinafter described, the lower limit and the upper limit are denoted as the lower limit (1) and the upper limit (1) in FIG. 20 (expressed by the numeral in circle in the drawing).

Next, the entry number management table 670 compares the sum (e_c+e_m) of the current use entry number e_c and the addition or deletion entry number e_m with the use entry number lower limit (1) and upper limit (1) (step S2004). If (e_c+e_m) is greater than the use entry number upper limit (1) ("upper limit (1)<(e_c+e_m)" at step S2004), a table memory increase control flow starts. The table memory increase control flow will be described later using FIG. 21.

After the end of the table memory increase control flow, the table memory control section 640 notifies an entry addition/deletion instruction to the table access section 630 (step S2005). The table access section 630 adds or deletes the entry to or from the retrieval table 610 in accordance with the entry addition/deletion instruction (step S2006). Next, the table memory control section 640 updates the use entry number of the concerned table classification in the entry number management table 660 to (e_c+e_m) (step S2007), and the table memory control flow is ended.

If (e_c+e_m) is greater than or equal to the use entry number lower limit (1) and smaller than or equal to the use entry number upper limit (1) at step S2004 ("lower limit (1)≤(e_c+e_m)≤upper limit (1)" at step S2004), the processings at steps S2005, S2006 and S2007 are performed, and the table memory control flow is ended.

If (e_c+e_m) is smaller than the use entry number lower limit (1) at step S2004 ("(e_c+e_m)<lower limit (1)" at step S2004), the table memory decrease control flow is performed. The table memory decrease control flow will be described later using FIG. 22.

Figure 21:
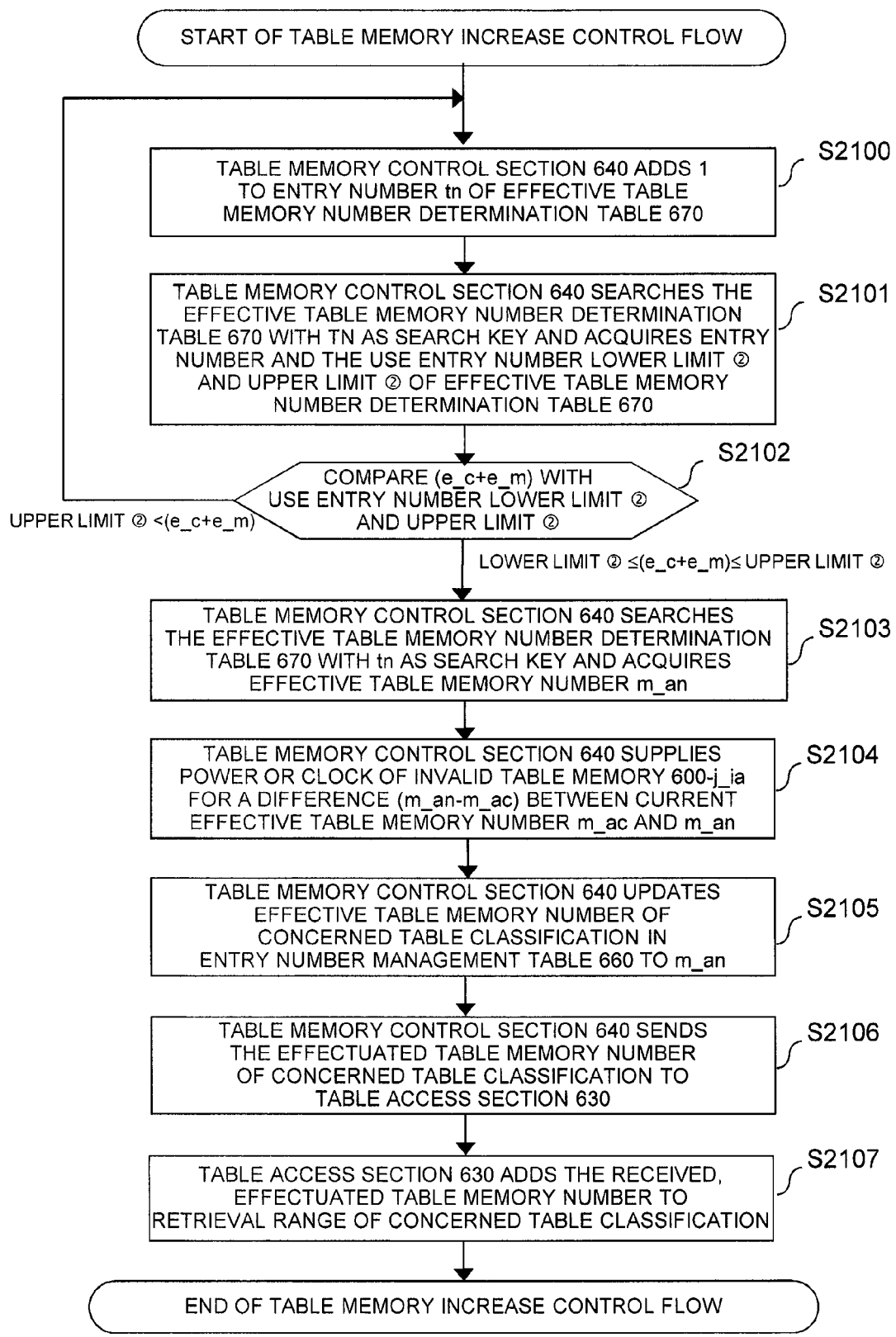
FIG. 21 is a flowchart showing a process for increasing a table memory number in the table control section.

FIG. 21 is a flowchart of the table memory increase control flow.

The table memory control section 640 adds one to the entry number tn of the effective table memory number determination table 670 (step S2100). Next, the table memory control section 640 searches the effective table memory number determination table 670 for the entry number with tn as the search key, and acquires the corresponding use entry number lower limit and upper limit in the effective table memory number determination table 670 (step S2101). To distinguish them from the upper limit and lower limit of FIG. 20, the lower limit and the upper limit are denoted as the lower limit (2) and the upper limit (2) in FIG. 21.

Next, the table memory control section 640 compares (e_c+e_m) with the use entry number lower limit (2) and upper limit (2) (step S2102). If (e_c+e_m) is greater than the use entry number upper limit (2) ("upper limit (2)<(e_c+e_m)" at step S2102), the operation returns to step S2100. If (e_c+e_m) is greater than or equal to the use entry number lower limit (2) and smaller than or equal to the use entry number upper limit (2) ("lower limit (2)≤(e_c+e_m)≤upper limit (2)" at step S2102), the table memory control section 640 searches the effective table memory number determination table 670 with tn as the search key, and acquires the effective table memory number m_an (step S2103).

Next, the table memory control section 640 supplies the power or clock to the invalid table memory 600-j_ia for a difference (m_an−m_ac) between the current effective table memory number m_ac and m_an (step S2104). Next, the table memory control section 640 updates the effective table memory number of the concerned table classification in the entry number management table 660 to m_an (step S2105). Next, the table memory control section 640 sends the table memory number of the concerned table classification effectuated to the table access section 630 (step S2106). The table access section 630 adds the received, effectuated table memory number to the retrieval range of the concerned table classification (step S2107), the table memory increase control flow is ended, and the operation returns to step S2005 of FIG. 20.

Figure 22:
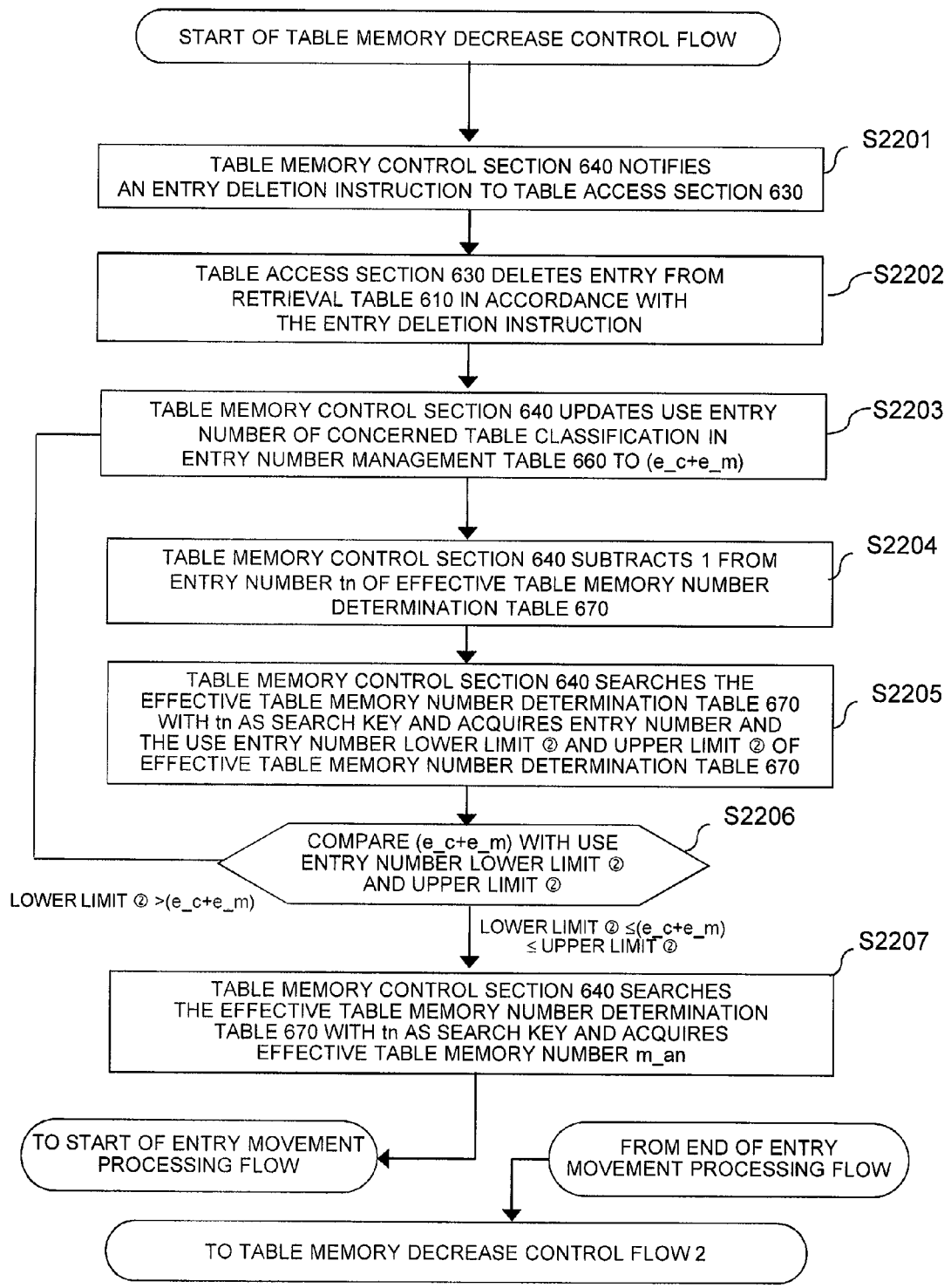
FIG. 22 is a flowchart showing a process for decreasing the table memory number in the table control section.

FIG. 22 is a flowchart of the table memory decrease control flow.

The table memory control section 640 notifies an entry deletion instruction to the table access section 630 (step S2201). The table access section 630 deletes the entry from the retrieval table 610 in accordance with the entry deletion instruction (step S2202). The table memory control section 640 updates the use entry number of the concerned table classification in the entry number management table 660 to (e_c+e_m) (step S2203). Next, the table memory control section 640 subtracts one from the entry number tn of the effective table memory number determination table 670 (step S2204). Next, the table memory control section 640 searches the effective table memory number determination table 670 for the entry number with tn as the search key, and acquires the corresponding use entry number lower limit and upper limit of the effective table memory number determination table 670 (step S2205). To distinguish them from the upper limit and the lower limit of FIG. 20, the lower limit and the upper limit are denoted as the lower limit (2) and the upper limit (2) in FIG. 22.

Next, the table memory control section 640 compares (e_c+e_m) with the use entry number lower limit (2) and upper limit (2) (step S2206). If (e_c+e_m) is smaller than the use entry number lower limit (2) ("lower limit (2)>(e_c+e_m)" at step S2206), the operation returns to step S2204. If (e_c+e_m) is greater than or equal to the use entry number lower limit (2) and smaller than or equal to the use entry number upper limit (2) ("lower limit (2)≤(e_c+e_m)≤upper limit (2)" at step S2206), the table memory control section 640 searches the effective table memory number determination table 670 with tn as the search key, and acquires the corresponding effective table memory number m_an (step S2207). Next, an entry movement processing flow starts. The entry movement processing flow will be described later in FIG. 24. After the end of the entry movement processing flow, the table memory decrease control flow 2 starts.

Figure 23:
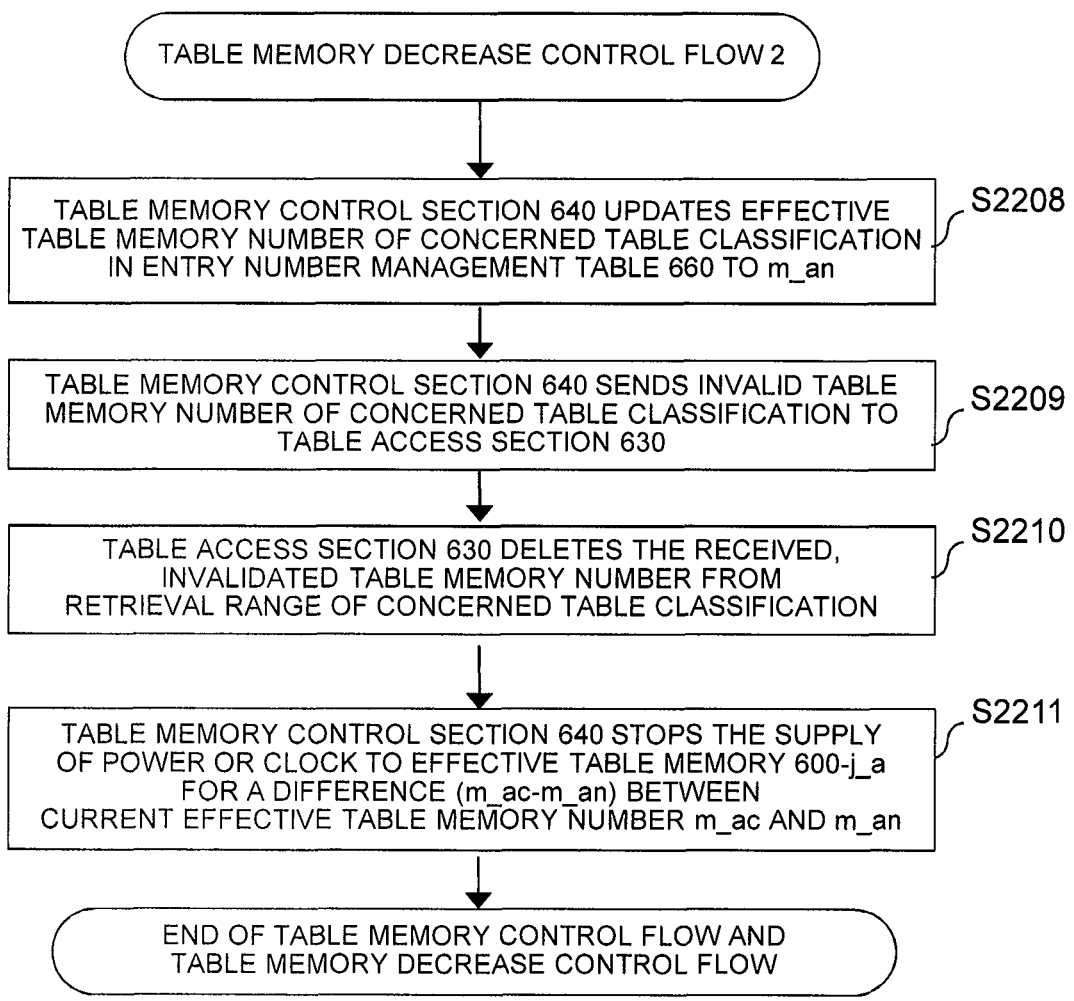
FIG. 23 is a flowchart showing the process for decreasing the table memory number in the table control section, continued from FIG. 22.

FIG. 23 is a flowchart showing the table memory decrease control flow continued from FIG. 22.

The table memory control section 640 updates the effective table memory number of the concerned table classification in the entry number management table 660 to m_an (step S2208). Next, the table memory control section 640 sends the table memory number of the concerned table classification invalidated through the entry movement process to the table access section 630 (step S2209). The table access section 630 deletes the received, invalidated table memory number from the search range of the concerned table classification (step S2210). The table memory control section 640 stops the supply of power or clock to the effective table memory $600\text{-}j\_a$ for a difference (m_ac−m_an) between the current effective table memory number m_ac and m_an (step S2211), and the table memory control flow and the table memory decrease control flow are ended.

Figure 24:
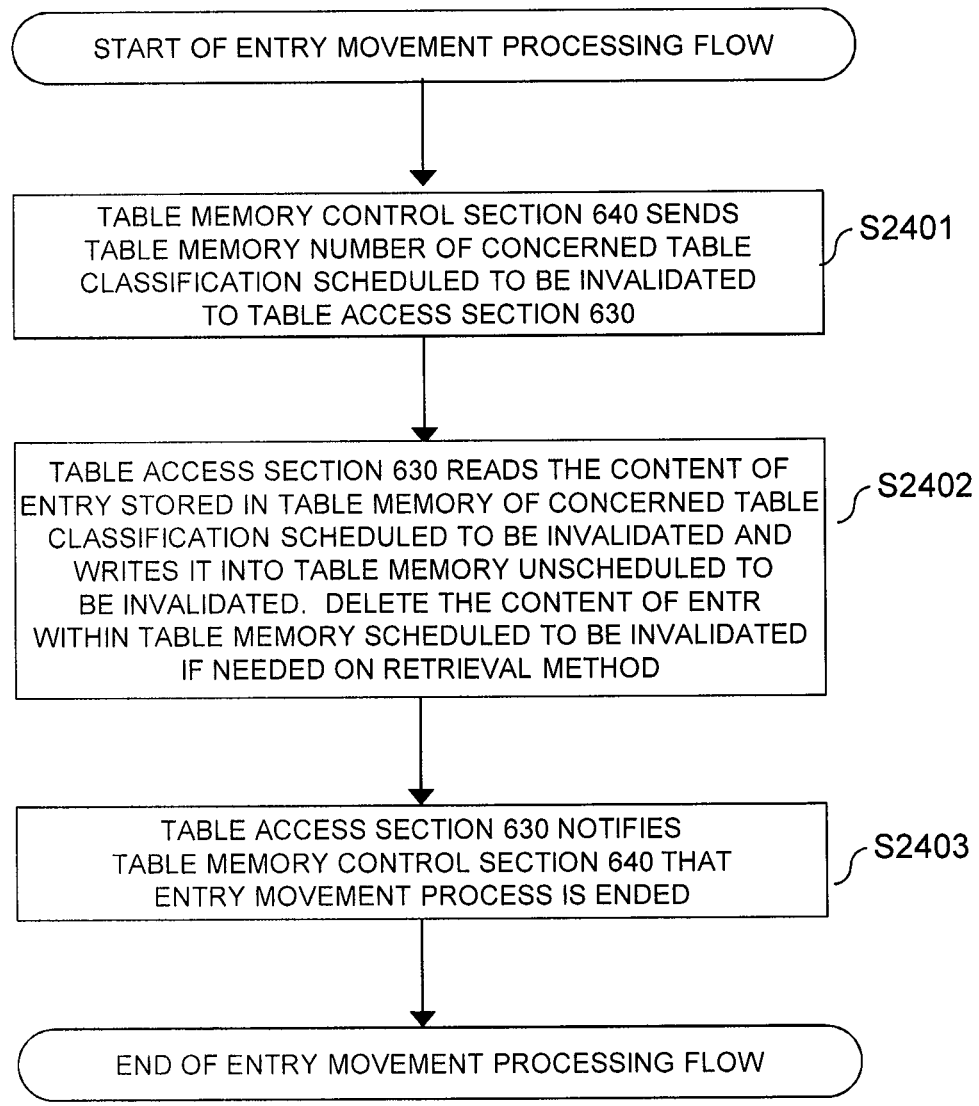
FIG. 24 is a flowchart showing an entry movement process that is performed in the process for decreasing the table memory number.

FIG. 24 is a flowchart of an entry movement processing flow.

The table memory control section 640 sends the table memory number of the concerned table classification scheduled to be invalidated to the table access section 630 (step S2401). A way of selecting the table to be invalidated is made in accordance with a prescribed rule. The table access section 630 reads the content of the entry stored in the table memory of the concerned table classification scheduled to be invalidated, and writes it into the table memory unscheduled to be invalidated. The content of the entry in the table memory scheduled to be invalidated is deleted, if needed on the search method (step S2402). Next, the table access section 630 notifies the table memory control section 640 that the entry movement process is ended (step S2403), and the entry movement processing flow is ended.

In the above embodiment, the power consumption is reduced by controlling the feeding of power or the supply of clock to the plurality of table memories making up the retrieval table in accordance with the number of entries for use.

One example of a method for organizing the table memory, and one example of the entry movement process in this case will be described below.

Figure 25:
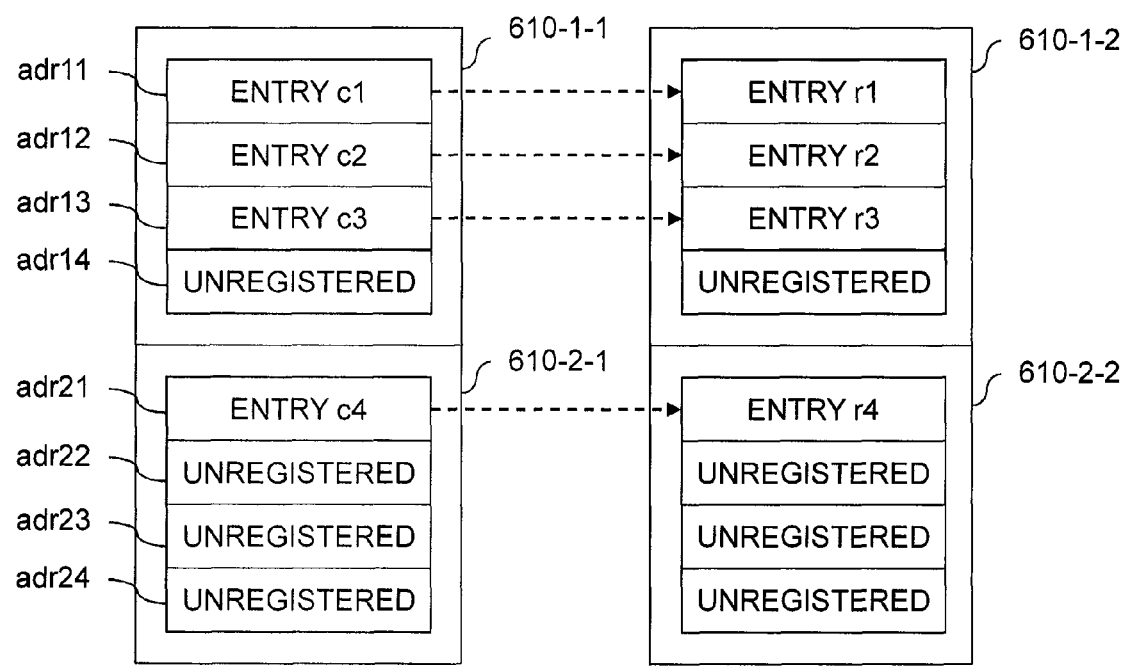
FIG. 25 is an explanatory view showing one example of a state before the entry movement process in the case that a retrieval table 610 has a Content Addressable Memory (CAM) and a Random Access Memory (RAM).

FIG. 25 is an explanatory view showing one example of a state before the entry movement process in the case that the retrieval table 610 has the CAM and the RAM. The search key information is set in the CAM, and the destination information corresponding to the search key is set in the RAM. Also, if the search key hits plural entries, the result with younger entry position is validated.

In the example of FIG. 25, the CAM has two table memories 610-1-1 and 610-2-1. Within each table memory, four entries, for example, are registered. The four entry positions within the table memory 610-1-1 are denoted as adr11 to adr14, respectively. Similarly, the four entry positions within the table memory 610-2-1 are denoted as adr21 to adr24, respectively. Three entries (entry c1, entry c2, entry c3) are registered within the table memory 610-1-1. Also, one entry (entry c4) is registered within the table memory 610-2-1.

Also, in the example of FIG. 25, the RAM has two table memory entries 610-1-2 and 610-2-2. Within each table memory, four entries, for example, are registered. The entries of the RAM correspond one-to-one to the entries of the CAM. Within the table memory 610-1-2, the entry r1, entry r2 and entry r3 are registered corresponding to the entry c1, entry c2 and entry c3, respectively. Also, within the table memory 610-2-2, the entry r4 is registered, corresponding to the entry c4.

Further, the entry position adr14 within the table memory 610-1-1 and the corresponding entry position within the table memory 610-1-2 are in unregistered state of entry. Also, the entry positions adr22, adr23 and adr24 within the table memory 610-2-1 and the corresponding entry positions within the table memory 610-2-2 are in unregistered state of entry.

In the following, as one example of the entry movement process, a process for moving the entry c4 and the entry r4 registered in the table memory 610-2-1 and the table memory 610-2-2 to the entry positions in the unregistered state of the table memory 610-1-1 and the table memory 610-1-2 to deactivate the table memory 610-2-1 and the table memory 610-2-2 will be described below. In this example, the movement process is performed in the order of FIG. 26, FIG. 27 and FIG. 28.

Figure 26:
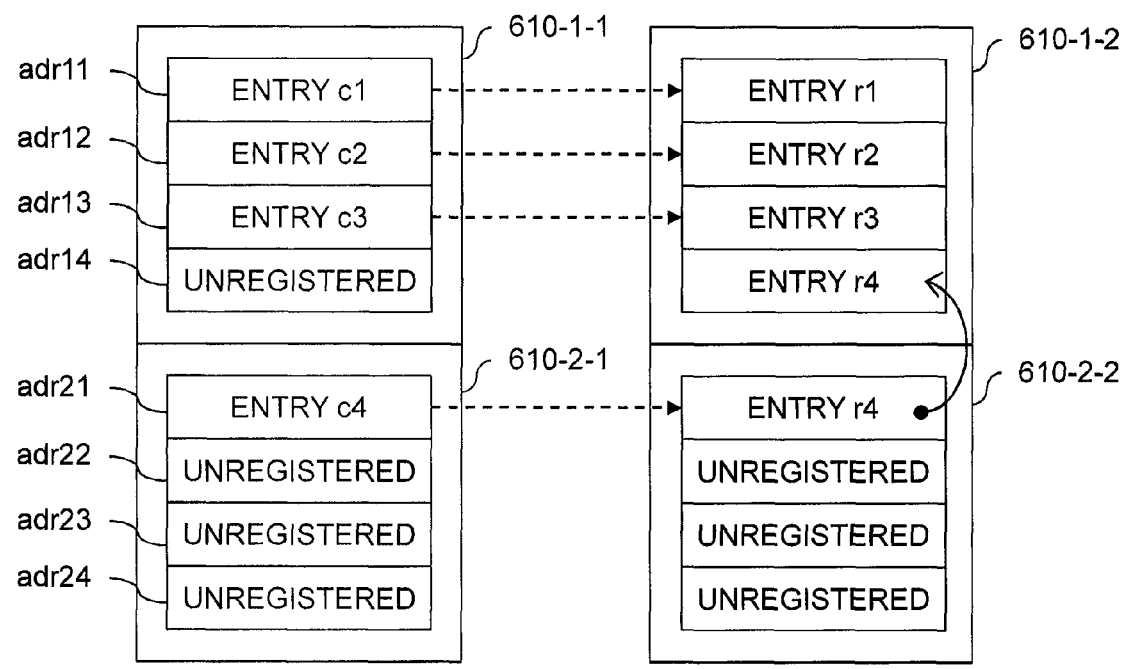
FIG. 26 is an explanatory view showing one example of a state where an entry within the RAM is copied in the entry movement process in the case that the retrieval table 610 has the CAM and the RAM.

FIG. 26 is an explanatory view showing one example of a state where the entry within the RAM is copied in the entry movement process. To minimize the stop time of the retrieval process for the retrieval table that is performed in the device in receiving the packet, a first step of the entry movement process includes first of all copying the content of the entry r4 that is the entry within the RAM from the table memory 610-2-2 to the unregistered entry position of the table memory 610-1-2. At this point of time, if the packet header information matched with the entry c4 is inputted as the search key in the retrieval process in receiving the packet, the entry at the entry position adr21 within the table memory 610-2-1 is hit.

Figure 27:
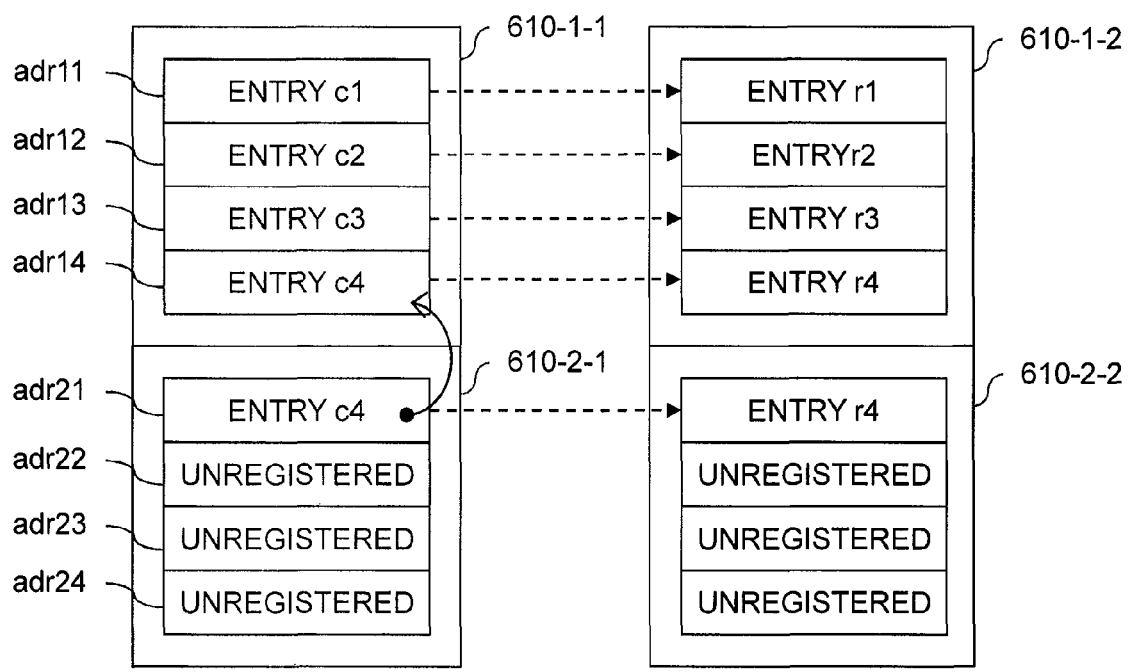
FIG. 27 is an explanatory view showing one example of a state where an entry within the CAM is copied in the entry movement process in the case that the retrieval table 610 has the CAM and the RAM.

FIG. 27 is an explanatory view showing one example of a state where the entry within the CAM is copied in the entry movement process. A second step of the entry movement process includes copying the content of the entry c4 that is the entry within the CAM from the table memory 610-2-1 to the unregistered entry position (adr14) of the table memory 610-1-1. By performing this process, if the packet header information matched with the entry c4 is inputted as the search key in the retrieval process in receiving the packet, the entry at the entry position adr14 within the table memory 610-1-1 is hit.

Figure 28:
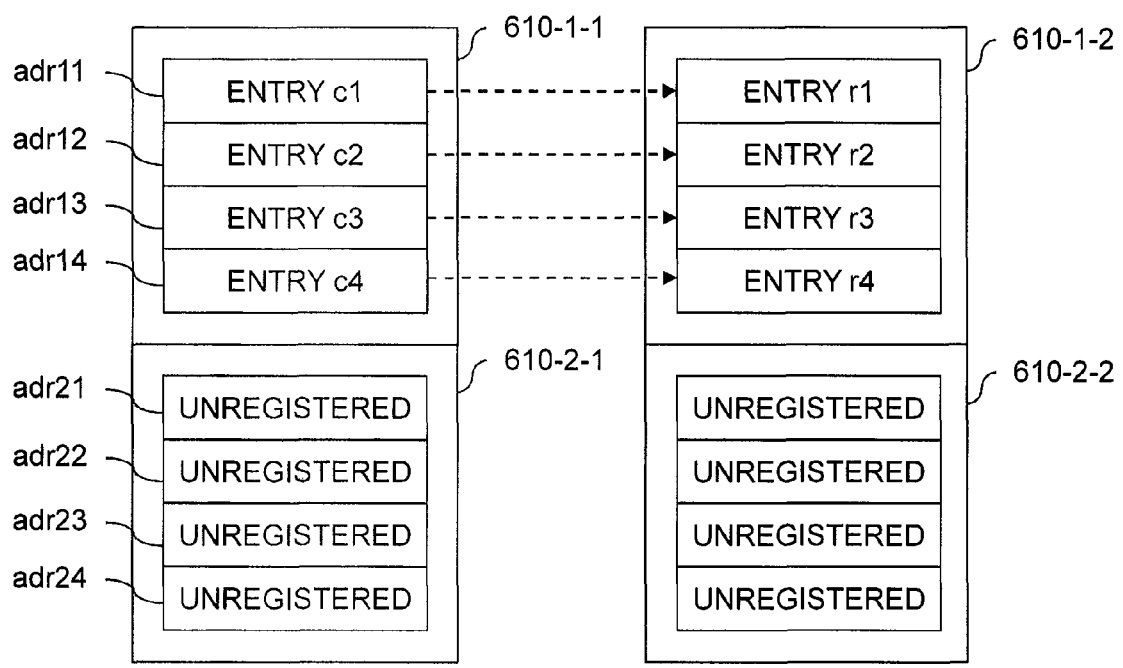
FIG. 28 is an explanatory view showing one example of a state where the entries of copy source within the CAM and the RAM are deleted in the entry movement process in the case that the retrieval table 610 has the CAM and the RAM.

FIG. 28 is an explanatory view showing one example of a state where the entry of copy source within the CAM is deleted in the entry movement process. After the process of FIG. 27, the entry c4 of copy source registered at adr21 of the table memory 610-2-1 and the corresponding entry r4 are unnecessary, whereby it may be possible to delete those entries and change them to the unregistered state. Also, the table memory 610-2-1 and the table memory 610-2-2 are invalidated by stopping the supply of power or clock after this, whereby the entry may not be deleted and unregistered.

Next, another embodiment of the method for organizing the table memory as shown in FIGS. 25 to 28 and the entry movement process in this case will be described below.

Figure 34:
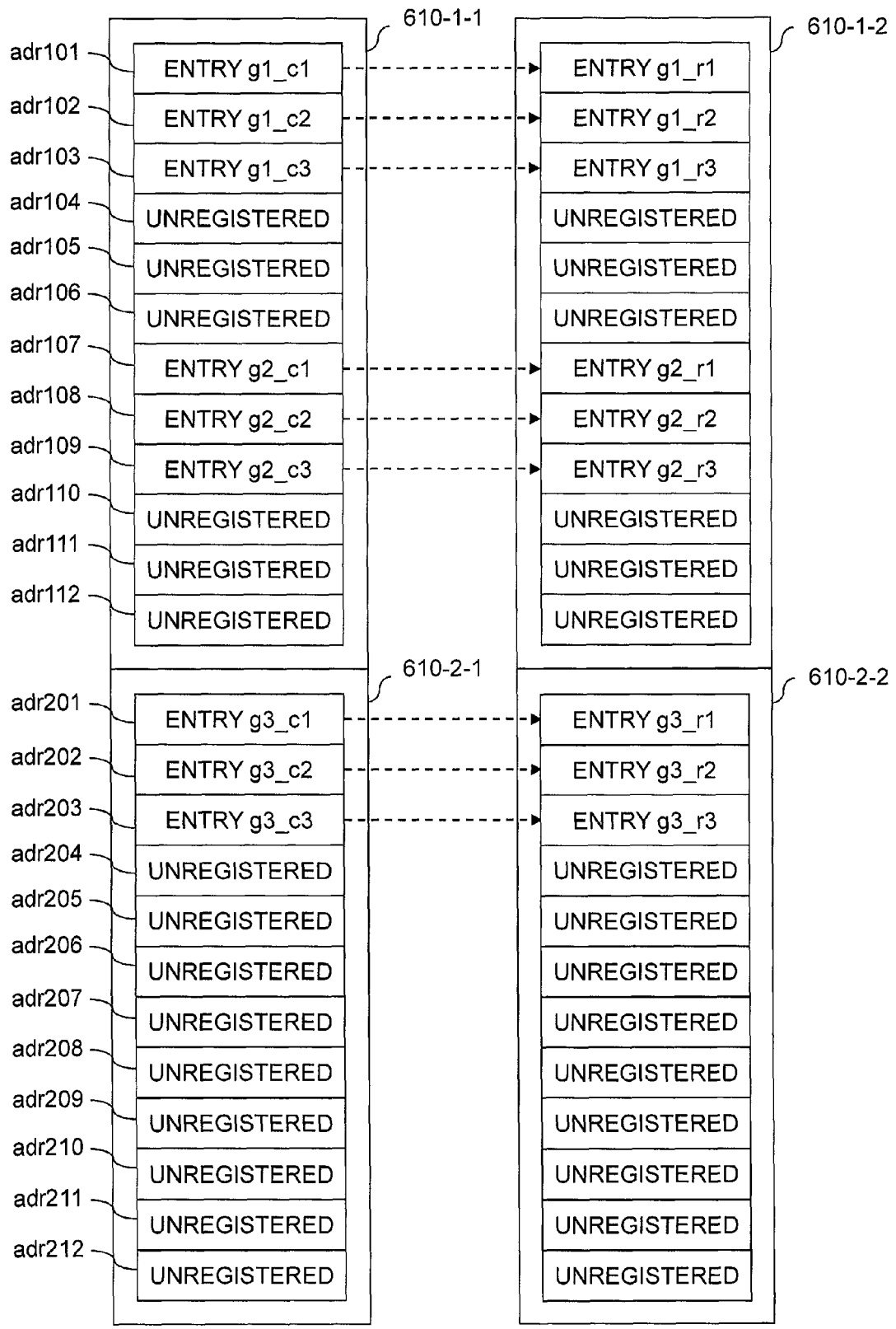
FIG. 34 is an explanatory view showing another example of a state before the entry movement process in the case that the retrieval table 610 has the CAM and the RAM.

In an example of FIG. 34, the CAM has two table memories 610-1-1 and 610-2-1. Twelve entries, for example, are registered within each table memory. Twelve entry positions within the table memory 610-1-1 are denoted as adr101 to adr112, respectively. Similarly, twelve entry positions within the table memory 610-2-1 are denoted as adr201 to adr212, respectively. Six entries (entry g1_c1, entry g1_c2, entry g1_c3, entry g2_c1, entry g2_c2, entry g2_c3) are registered within the table memory 610-1-1. Also, three entries (entry g3_c1, entry g3_c2, entry g3_c3) are registered within the table memory 610-2-1. The entries g1_c1, g1_c2 and g1_c3 are a group having dependence on the registration sequence as shown, and designated as a group 1. Also, the entries g2_c1, g2_c2 and g2_c3 are the same group, and designated as a group 2. Also, the entries g3_c1, g3_c2 and g3_c3 are the same group, and designated as a group 3. An unregistered area is provided between the groups so that the new entry can be registered in each group during the device operation. Specifically, adr104, adr105, adr106, adr110, adr111 and adr112 are unregistered in the table memory 610-1-1, and adr204 to adr212 are unregistered in the table memory 610-2-1.

Also, in the example of FIG. 34, the RAM has two table memory entries 610-1-2 and 610-2-2. Twelve entries, for example, are registered within each table memory. The entries of the RAM correspond one-to-one to the entries of the CAM. The entry g1_r1, entry g1_r2, entry g1_r3, entry g2_r1, entry g2_r2, entry g2_r3 are registered, corresponding to the entry g1_c1, entry g1_c2, entry g1_c3, entry g2_c1, entry g2_c2, entry g2_c3, within the table memory 610-1-2. Also, the entry g3_r1, entry g3_r2 and entry g3_r3 are registered, corresponding to the entry g3_c1, entry g3_c2 and entry g3_c3, within the table memory 610-2-2.

In the following, as one example of the entry movement process, a process for moving the entry g3_c1, entry g3_c2, entry g3_c3, entry g3_r1, entry g3_r2 and entry g3_r3 registered within the table memory 610-2-1 and the table memory 610-2-2 to the entry positions in unregistered state of the table memory 610-1-1 and the table memory 610-1-2 to deactivate the table memory 610-2-1 and the table memory 610-2-2 will be described below. In this example, the movement process is performed in the order of FIG. 35 and FIG. 36. The movement procedure of each entry is the same procedure as described in FIGS. 25 to 28.

Figure 35:
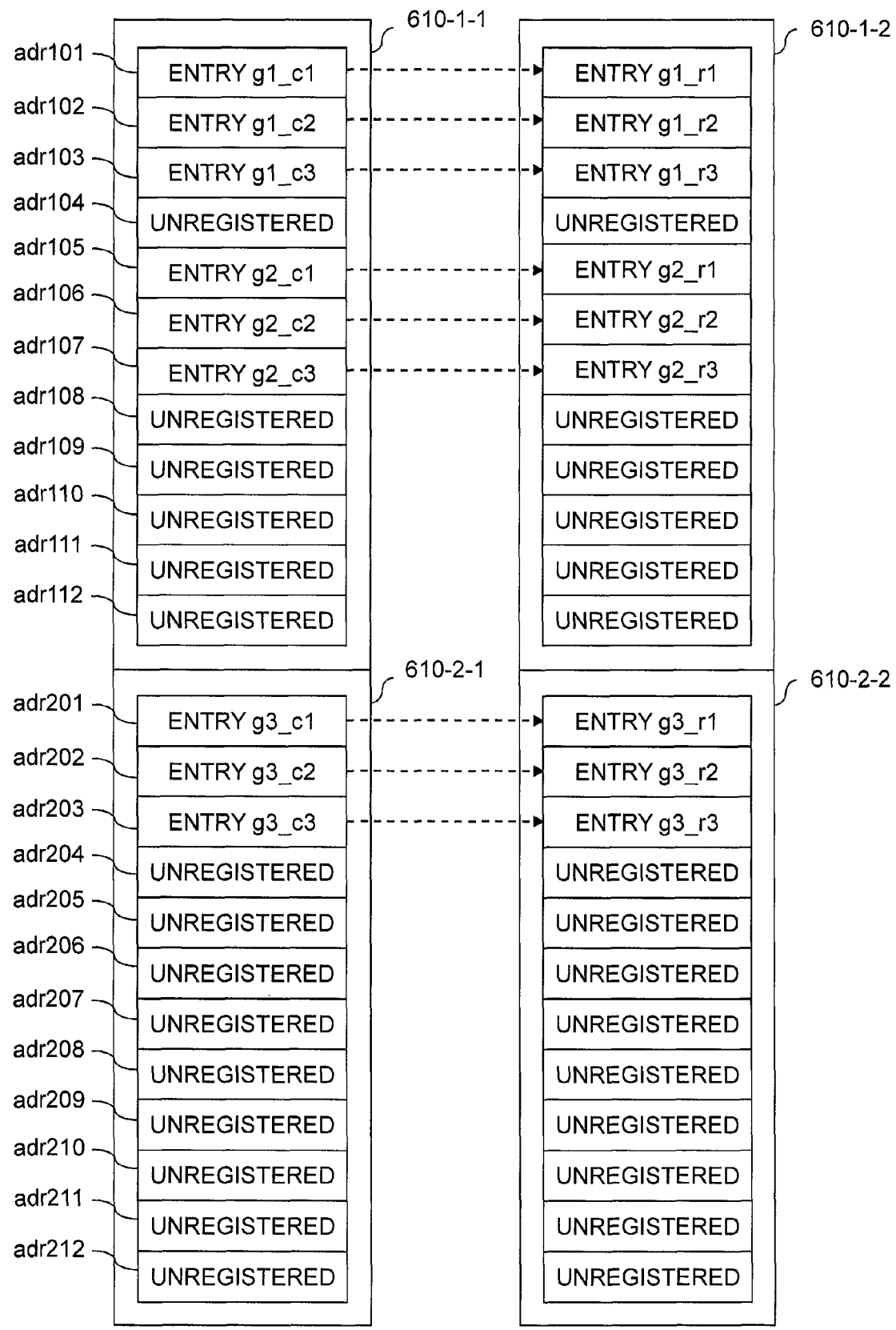
FIG. 35 is an explanatory view showing one example in a state where the entries in group 2 within the RAM are moved in the entry movement process in the case that the retrieval table 610 has the CAM and the RAM.

FIG. 35 is an explanatory view showing a state after three entries of the group 2 are moved to reserve an area for moving three entries of the group 3 while reserving a new registration area of the group 1 and the group 2 in the entry movement process. The entries of the group 2 are moved from the addresses adr107 to adr109 to the addresses adr105 to adr107.

Figure 36:
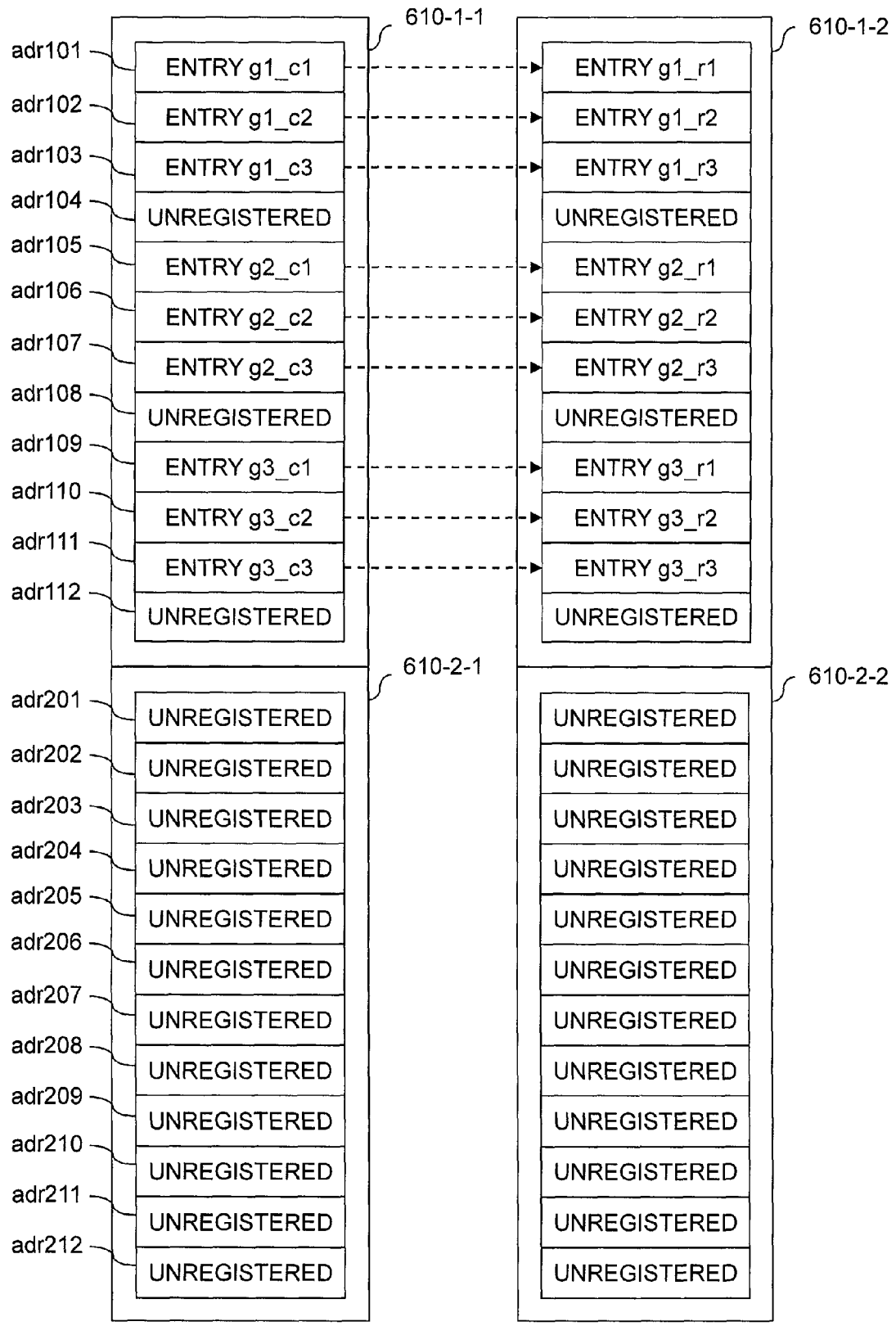
FIG. 36 is an explanatory view showing one example of a state where the entries in group 3 within the RAM are moved in the entry movement process in the case that the retrieval table 610 has the CAM and the RAM.

FIG. 36 is an explanatory view showing a state after three entries of the group 3 are moved to the table memory 610-1-1 and the table 610-2-1 in the entry movement process. The entries of the group 3 are moved from the addresses adr201 to adr203 to the addresses adr109 to adr111. In this example, each entry of the table memory to be deactivated can be moved without changing the order of groups g1 to g3, while reserving the new registration area.

Next, another embodiment of the method for organizing the table memory and the entry movement process in this case will be described below.

Figure 29:
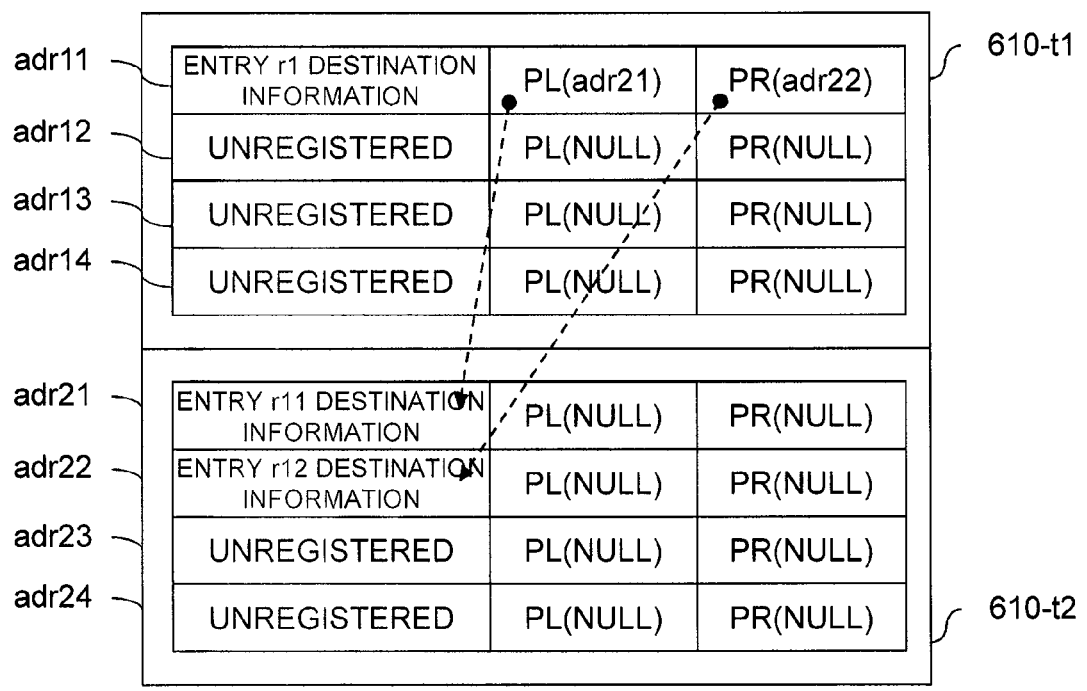
FIG. 29 is an explanatory view showing one example of a state before the entry movement process in the case that the retrieval table 610 has the RAM and further the table has a binary tree.

FIG. 29 is an explanatory view showing one example of a state before the entry movement process in the case that the retrieval table 610 has the RAM and further the table has a binary tree.

In the example of FIG. 29, the RAM has two table memories 610-t1 and 610-t2. Within each table memory, four entries, for example, are registered. The four entry positions within the table memory 610-t1 are denoted as adr11 to adr14, respectively. Similarly, the four entry positions within the table memory 610-t2 are denoted as adr21 to adr24, respectively.

Each entry set within the retrieval table RAM includes a destination information field for storing the destination information and the pointer fields (a PL field and a PR field) for setting two pointers pointing to the storage position of two left and right child nodes.

In FIG. 29, the entry r1 that is the parent node of the binary tree and the entry r11 and entry r12 that are two child nodes of the entry r1 are set. The entry r1 is set at adr11 within the table memory 610-t1, in which adr21 of storage information of the entry r11 that is the left child node is set in the PL field and adr22 of storage information of the entry r12 that is the right child node is set in the PR field. The entry r11 and the entry r12 are set at adr21 and adr22 within the table memory 610-t2, respectively. In FIG. 29, the entry r11 and the entry r12 are the final node of the binary tree, whereby "NULL" is set in the PL field and the PR field.

Also, no entry is registered at adr12, adr13 and adr14 of the table memory 610-t1. Also, no entry is registered at adr23 and adr24 of the table memory 610-t2.

In the following, as one example of the entry movement process, a process for moving the entry r11 and the entry r12 registered in the table memory 610-t2 to the entry positions in unregistered state of the table memory 610-t1 to deactivate the table memory 610-t2 will be described below. In this example, the movement process is performed in the order of FIG. 30, FIG. 31 and FIG. 32.

Figure 30:
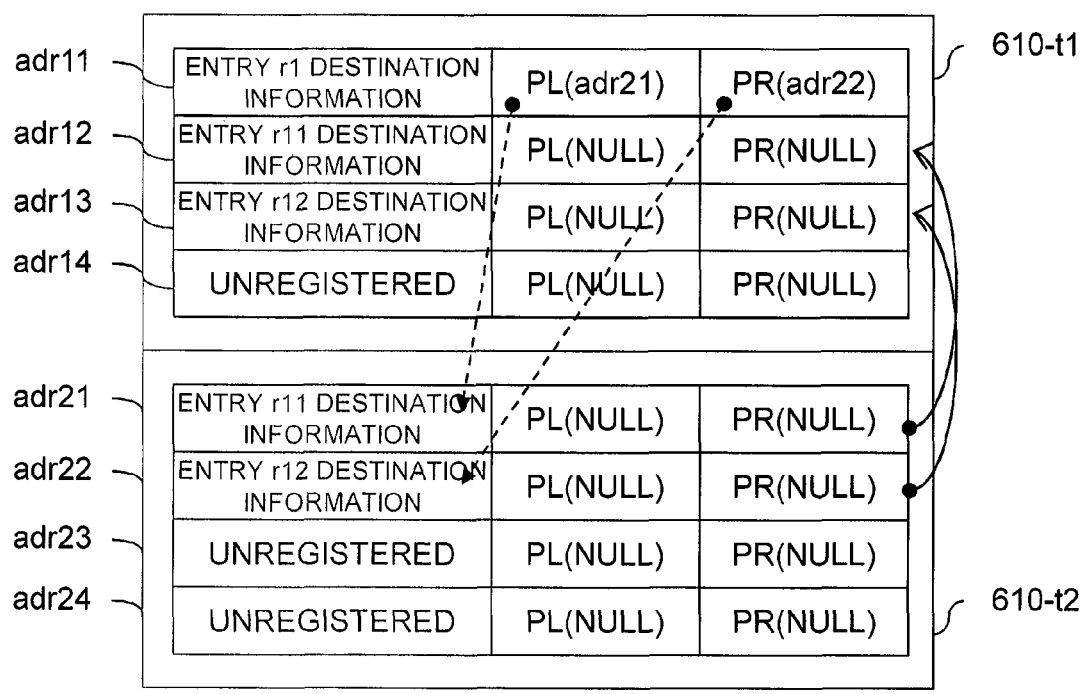
FIG. 30 is an explanatory view showing one example of a state where the entries in the child nodes of the binary tree are copied in the entry movement process in the case that the retrieval table 610 has the RAM and further the table has the binary tree.

FIG. 30 is an explanatory view showing one example of a state where the entries in the child node of the binary tree are copied. To minimize the stop time of the retrieval process for the retrieval table performed in the device in receiving the packet, a first step of the entry movement process of this example includes first of all copying the content of the entry r11 and the entry r12 from the table memory 610-t2 to the unregistered entry positions of the table memory 610-t1. At this point of time, if the packet header information arriving from the entry r1 to the entry r11 or entry r12 is inputted as the search key in the retrieval process in receiving the packet, the table of the binary tree structure is searched in the order from the entry r1 within the table memory 610-t1 to the entry r11 or entry r12 within the table memory 610-t2, so that the destination information of the entry r11 or entry r12 finally reached is obtained as the search result.

Figure 31:
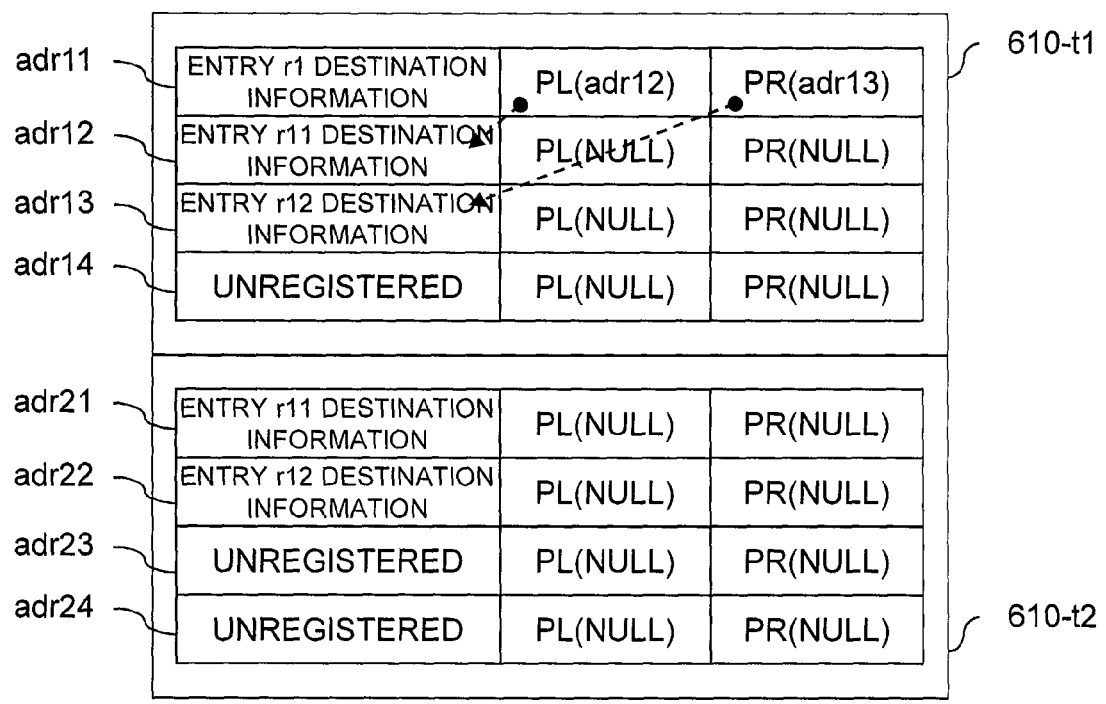
FIG. 31 is an explanatory view showing one example of a state where the contents of a pointer pointing to the storage position of the child nodes set within the parent node of the binary tree are changed in the entry movement process in the case that the retrieval table 610 has the RAM and further the table has the binary tree.

FIG. 31 is an explanatory view showing one example of a state where the contents of the pointers pointing to the storage position of the child nodes set within the parent node of the binary tree are changed. A second step of the entry movement process of this example includes changing the contents of the pointers pointing to the storage position of two child nodes set within the entry r1 that is the parent node from adr21 and adr22 of the table memory 610-t2 to adr12 and adr13 of the table memory 610-t1. By performing this process, if the packet header information arriving at the entry r11 or entry r12 is inputted as the search key in the retrieval process in receiving the packet, the entry r11 or entry r12 within the table memory 610-t1 is reached.

Figure 32:
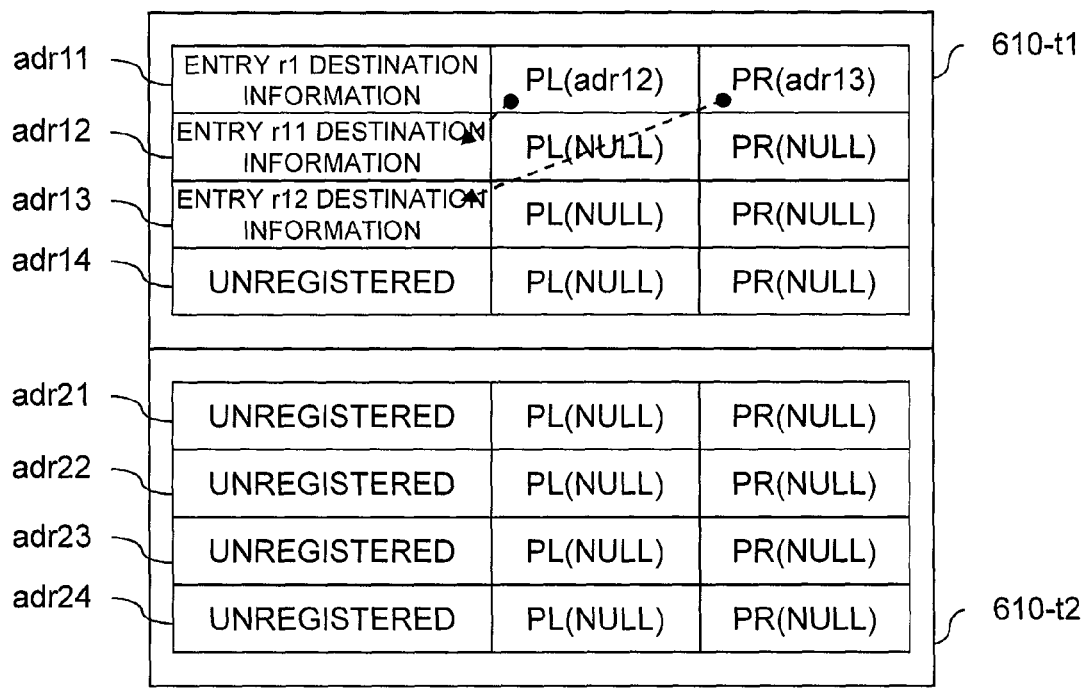
FIG. 32 is an explanatory view showing one example of a state where the child nodes of copy source in the binary tree are deleted in the entry movement process in the case that the retrieval table 610 has the RAM and further the table has the binary tree.

FIG. 32 is an explanatory view showing one example of a state where the child nodes of the binary tree of copy source are deleted. After the process of FIG. 31, the entry r11 or entry r12 of copy source registered at adr21 or adr22 of the table memory 610-t2 is unnecessary, whereby it may be possible to delete the entry and change it to the unregistered state. Also, the table memory 610-t2 is invalidated by stopping the supply of power or clock after this, whereby the entry may not be deleted and unregistered.

The invention is applicable to a network relay device such as a switch or router.

What is claimed is:

1. A network relay device for relaying a packet, comprising:
   a packet receiving section;
   a plurality of packet buffers operating independently of each other, in which the packet received by the packet receiving section is stored;
   a packet sending section configured to send the packet read from the packet buffer;

a packet monitor section configured to measure a transfer amount of packets for a certain period of time; and a packet buffer control section configured to control the packet buffer in accordance with the transfer amount of the packets;

wherein the packet buffer control section determines an effective buffer number required for the device depending on the transfer amount of the packets measured by the packet monitor section and a predetermined threshold, and controls the supply of power or clock to the packet buffers to be turned ON or OFF in accordance with the determined effective buffer number;

wherein a write control into the packet buffer manages a write pointer pointing to write position information in the packet buffer control section, in which every time one packet is received, the value of the write pointer is increased, and the packet is written into the packet buffer in accordance with the write pointer, wherein a read control from the packet buffer manages a read pointer pointing to read position information in the packet buffer control section, in which the packet is read from the packet buffer, and the value of the read pointer is increased every time the packet is read in response to an occurrence of an event that there is a difference of one or more between the value of the write pointer and the value of the read pointer, and wherein in response to an occurrence of an event that the packet buffer control section determines that the effective buffer number is decreased and there is no packet arriving at the packet receiving section within a predetermined period of time, a dummy packet set to be discarded within the self network relay device is inputted into the packet receiving section and flowed through the self network relay device to move the write pointer and the read pointer on the packet buffer scheduled to halt onto an effective buffer.

2. The network relay device according to claim 1, wherein the packet monitor section comprises
a packet counter for receiving a notice of receiving the packet from the packet receiving section and measuring a packet number,
a timer for counting the preset time, and
a packet number measuring section for measuring the transfer amount of the packets using a counter value of the packet counter and a timer value of the timer.

3. The network relay device according to claim 1, wherein the write pointer and the read pointer are cyclically increased in the value within an effective set range, and
the packet buffer control section specifies the packet buffer to turn off the power or stop the supply of clock so that the values in the effective range may be consecutive.

4. The network relay device according to claim 1, further comprising
a write processing section for managing an empty area of the packet buffer, selecting the empty area of the packet buffer to write the packet thereto and notifying identification information of a written area to the packet sending section,
wherein
the packet sending section reads relevant information from the packet buffer in accordance with the identification information and transfers it to an output line, and
the packet buffer control section selects the packet buffer to turn off the power or stop the supply of clock from the packet buffers with less packet written or the packet buffers without the packet written.

5. The network relay device according to claim 1,
wherein the packet buffer control section holds a first monitor packet number that is the basis for increasing the effective buffer number and a second monitor packet number that is the basis for decreasing the effective buffer number, corresponding to the effective buffer number, and
wherein the current effective buffer number is increased in response to an occurrence of an event that the transfer amount of packet exceeds the first monitor packet number corresponding to current effective buffer number, and the effective buffer number is decreased in response to an occurrence of an event that the transfer amount of packet is below the second monitor packet number corresponding to the current effective buffer number.

6. A network relay device for relaying a packet, comprising:
a plurality of table memories configured to store at least any one table of a destination table, a filter table and a priority control table, and operating independently of each other;
a table memory control section configured to store the table memory in accordance with an entry number to be stored in the table; and
a control section configured to instruct a registration or deletion of an entry into or from the table;
wherein
the table memory control section stores a current use entry number of the table, and the table memory control section determines a required effective table memory number from the current use entry number of the table and the registering entry number or the deleting entry number and a predetermined threshold, in response to, from the control section, an instruction of registering the entry including a registering entry number or an instruction of deleting the entry including a deleting entry number and controls a feeding of power or a supply of clock to a part of the table memories to be turned ON or OFF in accordance with determined effective table memory number.

7. The network relay device according to claim 6, wherein the table memory control section copies the table entry to the table memory which remains effective and turns off the feeding of power or stops the supply of clock to the table memory scheduled to be invalidated after copying in response to an occurrence of an event that the table memory control section determines that the effective table memory number is decreased, and a table entry is already stored in the table memory scheduled to be invalidated.

8. The network relay device according to claim 7, wherein the table memory has
a CAM for setting search key information and
a RAM for storing at least any one of destination information, filter information and priority control information corresponding to the search key,
wherein
firstly, the information stored in the RAM of the table memory scheduled to be invalidated is moved to the RAM of the table memory which remains effective, and
secondly, the information stored in the CAM of the table memory scheduled to be invalidated is moved to the CAM of the table memory which remains effective.

9. The network relay device according to claim 8, wherein the CAM of the table memory stores the search key information classified into a plurality of groups in the order of the groups,
the RAM of the table memory stores any of the destination information, the filter information and the priority control information that are classified into the plurality of groups in the order of the groups, and the information stored in the CAM and the RAM of the table memory scheduled to be invalidated is moved to the CAM and the RAM of the table memory which remains effective without changing the order of the groups.

10. The network relay device according to claim 9, wherein the information stored in the CAM and the RAM of the table memory which remains effective is moved without changing the order of the groups.

11. The network relay device according to claim 7, wherein the table memory is configured by a binary tree, the table memory has a destination information field for storing destination information and two pointer fields for setting pointers pointing to storage positions of two left and right child nodes, wherein firstly, information stored in the pointer field of the table memory scheduled to be invalidated is moved to the pointer field of the table memory which remains effective, and secondly, information stored in the destination information field of the table memory scheduled to be invalidated is moved to the destination information field of the table memory which remains effective.

12. The network relay device according to claim 6, wherein the table memory control section holds a use entry number upper limit value that is the basis for increasing the effective table memory number and a use entry number lower limit value that is the basis for decreasing the effective table memory number, corresponding to the effective table memory number, wherein the current effective table memory number is increased in response to the sum total of the current use entry number and the registering entry number or deleting entry number which exceeds the use entry number upper limit value, and the current effective table memory number is decreased in response to the sum total of the current use entry number and the registering entry number or deleting entry number which is below the use entry number lower limit value.

13. The network relay device according to claim 6, further comprising a packet receiving section, a plurality of packet buffers operating independently of each other, in which the packet received in the packet receiving section is stored, a packet sending section for sending the packet read from the packet buffer, a packet monitor section for measuring a transfer amount of packet for a certain period of time, and a packet buffer control section for controlling the packet buffer in accordance with the transfer amount of packet, wherein the packet buffer control section determines the effective buffer number required for the device depending on the transfer amount of packet measured by the packet monitor section and a predetermined threshold, and controls the feeding of power or the supply of clock to the packet buffers to be turned ON or OFF in accordance with determined effective buffer number.

14. A memory control method in a network relay device relaying a packet and comprising a plurality of packet buffers operating independently of each other, the packet buffers storing received packets, the method including:

measuring a transfer amount of the packets for a certain period of time;

determining an effective buffer number required for the network relay device depending on the measured transfer amount of packets and a predetermined threshold;

controlling a feeding of power or a supply of clock to packet buffers to be turned ON or OFF in accordance with the determined effective buffer number;

managing, for a write control into the packet buffer, a write pointer pointing to write position information, in which every time one packet is received, the value of the write pointer is increased, and the packet is written into the packet buffer in accordance with the write pointer, and managing, for a read control from the packet buffer, a read pointer pointing to read position information in the packet buffer control section, in which the packet is read from the packet buffer, and the value of the read pointer is increased every time the packet is read in response to an occurrence of an event that there is a difference of one or more between the value of the write pointer and the value of the read pointer, wherein in response to an occurrence of an event that the packet buffer control section determines that the effective buffer number is decreased and there is no packet arriving at the packet receiving section within a predetermined period of time, a dummy packet set to be discarded within the self network relay device is inputted into the packet receiving section and flowed through the self network relay device to move the write pointer and the read pointer on the packet buffer scheduled to halt onto an effective buffer.

15. A memory control method in a network relay device relaying a packet and comprising a plurality of table memories for storing at least any one table of a destination table, a filter table and a priority control table, and for operating independently of each other, the method including:

storing in advance a current use entry number of the table;

determining a required effective table memory number from the current use entry number of the table and a registering entry number or a deleting entry number and a predetermined threshold in response to an instruction of registering an entry including the registering entry number or an instruction of deleting the entry including the deleting entry number is notified; and controlling a feeding of power or a supply of clock to a part of the table memories to be turned ON or OFF in accordance with determined effective table memory number.

* * * * *